(12) United States Patent
Opshaug et al.

(10) Patent No.: US 11,750,346 B2
(45) Date of Patent: Sep. 5, 2023

(54) SIGNAL STRUCTURE FOR NAVIGATION AND POSITIONING SIGNALS

(71) Applicant: QUALCOMM Incorporated, San Diego, CA (US)

(72) Inventors: Guttorm Ringstad Opshaug, Redwood City, CA (US); Sven Fischer, Nuremberg (DE); Naga Bhushan, San Diego, CA (US); Stephen William Edge, Escondido, CA (US); Jie Wu, San Diego, CA (US); Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/107,713

(22) Filed: Aug. 21, 2018

(65) Prior Publication Data
US 2019/0305901 A1    Oct. 3, 2019

Related U.S. Application Data

(60) Provisional application No. 62/652,243, filed on Apr. 3, 2018.

(51) Int. Cl.
*H04L 5/00*    (2006.01)
*H04W 64/00*    (2009.01)
(Continued)

(52) U.S. Cl.
CPC ............. *H04L 5/005* (2013.01); *G01S 5/10* (2013.01); *H04W 64/003* (2013.01);
(Continued)

(58) Field of Classification Search
CPC ... H04W 64/00; H04W 24/10; H04W 64/003; H04W 4/02; H04W 88/02; H04W 88/08;
(Continued)

(56) References Cited

U.S. PATENT DOCUMENTS

2010/0246505 A1* 9/2010 Chong ................ H04W 72/044
370/329
2010/0260154 A1 10/2010 Frank et al.
(Continued)

FOREIGN PATENT DOCUMENTS

EP    2418511 A1    2/2012
WO    2010118305 A2    10/2010
(Continued)

OTHER PUBLICATIONS

Updated OTDOA link-level results for synchronous case, 3GPP TSG-RAN WG4#54, Feb. 22-26, 2010, San Francisco, USA, R4-100739, Qualcomm Incorporated (Year: 2010).*
(Continued)

*Primary Examiner* — Srilakshmi K Kumar
*Assistant Examiner* — Jing Gao
(74) *Attorney, Agent, or Firm* — Thien T. Nguyen

(57) ABSTRACT

Methods, apparatuses, and computer-readable media are described. In one example, a method, on a base station, for providing position measurements signals in a wireless communication network, comprises: determining a plurality of subcarriers for downlink transmission, wherein the plurality of subcarriers for downlink transmission comprise all subcarriers indicated in a resource block of a scheduled time of transmission within a scheduled transmission occasion, wherein the resource block comprises a plurality of symbol periods, wherein each symbol period of the plurality of symbol periods is for transmission of a symbol using one or more subcarriers of the plurality of subcarriers; and transmitting at the scheduled time of transmission, and using each subcarrier of the plurality of subcarriers, a wireless position measurement signal at the scheduled transmission occasion, the wireless position measurement signal being part of a
(Continued)

sequence of wireless signals representing a position measurement signal bitstream.

26 Claims, 19 Drawing Sheets

(51) Int. Cl.
| | |
|---|---|
| *H04W 72/04* | (2023.01) |
| *G01S 5/10* | (2006.01) |
| *H04W 72/0446* | (2023.01) |
| *H04W 72/0453* | (2023.01) |
| *H04W 72/23* | (2023.01) |

(52) U.S. Cl.
CPC ... *H04W 72/0446* (2013.01); *H04W 72/0453* (2013.01); *H04W 72/23* (2023.01)

(58) Field of Classification Search
CPC ... H04W 4/023; H04W 72/042; H04W 16/14; H04W 4/025; H04W 72/0446; H04W 84/042; H04W 24/02; H04W 24/08; H04W 4/029; H04W 72/0406; H04W 72/08; H04W 72/04; H04W 76/28; H04W 36/06; H04W 48/12; H04W 48/16; H04W 4/20; H04W 52/283; H04W 56/00; H04W 56/006; H04W 72/005; H04W 72/0453; H04W 72/048; H04W 72/085; H04W 72/12; H04W 74/0808; H04W 74/0833; H04W 88/06; H04W 8/005; H04W 28/08; H04W 28/20; H04W 36/0061; H04W 36/0077; H04W 36/0094; H04W 36/22; H04W 36/32; H04W 40/244; H04W 48/10; H04W 48/18; H04W 4/022; H04W 52/146; H04W 52/248; H04W 56/001; H04W 56/004; H04W 56/0075; H04W 72/00; H04W 72/02; H04W 72/0413; H04W 72/1284; H04W 72/1289; H04W 74/002; H04W 76/10; H04W 76/27; H04L 5/0048; H04L 5/005; H04L 5/0053; H04L 27/2613; H04L 5/0051; H04L 5/0007; H04L 5/001; H04L 5/00; H04L 5/0098; H04L 5/0023; H04L 1/1607; G01S 5/10
See application file for complete search history.

(56) References Cited

U.S. PATENT DOCUMENTS

| | | | |
|---|---|---|---|
| 2011/0158200 A1* | 6/2011 | Bachu | H04L 5/0007 370/330 |
| 2012/0020302 A1 | 1/2012 | Xiao | |
| 2013/0176883 A1* | 7/2013 | Han | G01S 5/0036 370/252 |
| 2018/0077529 A1* | 3/2018 | Ryu | H04W 56/004 |
| 2019/0380056 A1* | 12/2019 | Lee | H04L 43/0882 |
| 2020/0154239 A1* | 5/2020 | Yamada | H04W 72/0446 |

FOREIGN PATENT DOCUMENTS

| | | | | |
|---|---|---|---|---|
| WO | 2011003030 A1 | 1/2011 | | |
| WO | WO-2011003030 A1 * | 1/2011 | | G01S 1/20 |
| WO | WO-2017062902 A1 | 4/2017 | | |
| WO | 2017172068 A1 | 10/2017 | | |
| WO | WO-2018025794 A1 | 2/2018 | | |

OTHER PUBLICATIONS

Walia et al. (Channel Estimation Techniques in MIMO-OFDM Systems—Review Article, Article in IJARCCE, May 2015, DOI: 10.17148/IJARCCE.2015.45135) (Year: 2915).*
Fischer S., "Observed Time Difference of Arrival (OTDOA) Positioning in 3GPP LTE", Qualcomm Technologies Inc, Jun. 3, 2014 (Jun. 6, 2014), pp. 1-62, XP055284784, Retrieved from the Internet: URL: http://www.terranautx.eom/s/Qualcomm-OTDOA-positioning-in-LTE-June-2014.pdf.
International Search Report and Wri I I En Opinion - PCT/US2019/020556 - ISA/EPO - 2019-05-29 K181205WO).
3rd Generation Partnership Project, Technical Specification Group Radio Access Network, Evolved Universal Terrestrial Radio Access (E-UTRA), Physical channels and modulation (Release 14), 3GPP TS 36.211 V14.6.0 (Mar. 2018), Apr. 2, 2018, pp. 1-192.
Ericsson: "On Design of OTDOA Positioning Reference Signal", 3GPP TSG-RAN1 Meeting #87, R1-1611116, Reno, Nevada, Nov. 14-18, 2016, pp. 1-5.
ITL: "Support of OTDOA in NB-Iot", R1-1610221, 3GPP TSG RAN WG1 Meeting #86bis, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150240, 9 Pages.
Taiwan Search Report—TW108107289—TIPO—dated Sep. 7, 2022.
Taiwan Search Report—TW108107289—TIPO—dated Apr. 30, 2023.

* cited by examiner

SIGNAL STRUCTURE FOR NAVIGATION AND POSITIONING SIGNALS

RELATED APPLICATIONS

This application claims the benefit of U.S. Provisional Application No. 62/652,243, filed Apr. 3, 2018, entitled "SIGNAL STRUCTURE FOR NAVIGATION AND POSITIONING SIGNALS," which is assigned to the assignee hereof, and incorporated herein in its entirety by reference.

BACKGROUND

1. Field

The subject matter disclosed herein relates to electronic devices, and more particularly to methods and apparatuses for use to support location determination of a mobile device using a fifth-generation (5G) wireless network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring the timing of radio signals received from a variety of devices including, for example, satellite vehicles (SVs), terrestrial radio sources (e.g., a base station), etc. in a multiple-access wireless network. Examples of such multiple-access networks include Code Division Multiple Access (CDMA) networks, Time Division Multiple Access (TDMA) networks, Frequency Division Multiple Access (FDMA) networks, etc. FDMA networks may include, for example, Orthogonal FDMA (OFDMA) networks, Single-Carrier FDMA (SC-FDMA) networks, etc.

In a FDMA wireless network, radio signals may be transmitted using multiple subcarriers of different frequency bands. A base station may be allocated a plurality of subcarriers as available wireless resources to perform the transmission of radio signals. With current technologies, the base station may use some, but not all, of the allocated subcarriers to transmit position measurement radio signals.

It is expected that standardization for new fifth-generation (5G) wireless networks will include support for various positioning methods both new and existing, but issues may arise with the current method of transmission of position measurement signals which can lead to false detection of the position measurement signals and inaccurate timing measurements. Embodiments disclosed herein address these issues by implementing techniques that improve the accuracy of detecting position measurement signals in 5G wireless networks.

SUMMARY

According to some examples, a base station for providing position measurements signals in a wireless communication network is provided. The base station comprises a memory, a wireless communication interface; and one or more processing units coupled to the memory and the wireless communication interface. The one or more processing units are configured to: determine a plurality of subcarriers for downlink transmission, wherein the plurality of subcarriers for downlink transmission comprise all subcarriers indicated in a resource block of a scheduled time of transmission within a scheduled transmission occasion, wherein the resource block comprises a plurality of symbol periods, wherein each symbol period of the plurality of symbol periods is for transmission of a symbol using one or more subcarriers of the plurality of subcarriers; and transmit, at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream. The wireless position measurement signal comprises one or more symbols transmitted in one or more symbol periods of the plurality of symbol periods. A timing of the scheduled transmission occasion of the wireless position measurement signal is such that it enables position measurements to be taken based on the timing.

In some aspects, the wireless position measurement signal comprises a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the wireless position measurement signal comprising the plurality of symbols.

In some aspects, at least two subcarriers of the plurality of subcarriers are used for transmission of different numbers of symbols. In some aspects, the wireless position measurement signal comprises one or more symbols. Each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols. The two symbols are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

According to some examples, a mobile device for performing position measurement is provided. The mobile device comprises: a memory; a wireless communication interface; and one or more processing units coupled to the memory and the wireless communication interface, wherein the one or more processing units are configured to: receive a sequence of radio signals at a scheduled time within a scheduled transmission occasion; determine a plurality of subcarriers for processing the sequence of radio signals, wherein the plurality of subcarriers comprise all subcarriers indicated in a resource block of the scheduled time, wherein the resource block comprises a plurality of symbol periods, wherein each symbol period of the plurality of symbol periods is for transmission of a symbol using one or more subcarriers of the plurality of subcarriers; process the sequence of radio signals using each of the plurality of subcarriers of the resource block to determine whether the sequence of radio signals represents a position measurement signal bitstream; and responsive to determining that the sequence of radio signals represents a position measurement signal bitstream: determine a time of receiving the position measurement signal bitstream based on a result of the processing, and perform position measurement based on the time of receiving the position measurement signal bitstream.

In some aspects, the sequence of radio signals represents a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the plurality of symbols. In some aspects, at least two subcarriers of the plurality of subcarriers are used for transmission of different numbers of symbols. In some aspects, the sequence of radio signals comprises one or more symbols. Each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols. The two symbols are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

In some aspects, the one or more processing units of the mobile device are configured to: generate a set of samples of the sequence of radio signals, each sample of the set of samples being associated with a timestamp; process the set of samples using a Fast Fourier Transform (FFT) processor to generate a sequence of amplitudes and phases of each subcarrier of the plurality of subcarriers; perform correlation operations on the sequence of amplitudes and phases to obtain one or more correlation products for each subcarrier of the plurality of subcarriers; determine an average of the one or more correlation products for each subcarrier of the plurality of subcarriers; obtain a frequency domain vector based on the average of the one or more correlation products for each subcarrier of the plurality of subcarriers; and reconstruct a sequence of time-domain signals based on the frequency domain vector. Processing the sequence of radio signals using each of the plurality of subcarriers of the resource block to determine whether the sequence of radio signals represents a position measurement signal bitstream comprises the one or more processing units being configured to use the sequence of time-domain signals to determine whether the sequence of radio signals represents a position measurement signal bitstream.

According to some examples, a method, on a base station, for providing position measurements signals in a wireless communication network is provided. The method comprises determining, at the base station, a plurality of subcarriers for downlink transmission, wherein the plurality of subcarriers for downlink transmission comprise all subcarriers indicated in a resource block of a scheduled time of transmission within a scheduled transmission occasion, wherein the resource block comprises a plurality of symbol periods, wherein each symbol period of the plurality of symbol periods is for transmission of a symbol using one or more subcarriers of the plurality of subcarriers; and transmitting, from the base station, at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream. The wireless position measurement signal comprises one or more symbols transmitted in one or more symbol periods of the plurality of symbol periods. A timing of the scheduled transmission occasion of the wireless position measurement signal is such that it enables position measurements to be taken based on the timing.

In some aspects, the wireless position measurement signal comprises a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the wireless position measurement signal comprising the plurality of symbols. In some aspects, at least two subcarriers of the plurality of subcarriers are used for transmission of different numbers of symbols. In some aspects, the wireless position measurement signal comprises one or more symbols. Each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols. The two symbols are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

According to some examples, a method, on a mobile device, for performing position measurement is provided. The method comprises: receiving, at the mobile device, a sequence of radio signals at a scheduled time within a scheduled transmission occasion; determining, on the mobile device, a plurality of subcarriers for processing the sequence of radio signals, wherein the plurality of subcarriers comprise all subcarriers indicated in a resource block of the scheduled time, wherein the resource block comprises a plurality of symbol periods, wherein each symbol period of the plurality of symbol periods is for transmission of a symbol using one or more subcarriers of the plurality of subcarriers; processing, on the mobile device, the sequence of radio signals using each of the plurality of subcarriers of the resource block to determine whether the sequence of radio signals represents a position measurement signal bitstream; and responsive to determining that the sequence of radio signals represents the position measurement signal bitstream: determining, on the mobile device, a time of receiving the position measurement signal bitstream based on a result of the processing, and performing, at the mobile device, position measurement based on the time of receiving the position measurement signal bitstream.

In some aspects, the sequence of radio signals represents a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the plurality of symbols. In some aspects, at least two subcarriers of the plurality of subcarriers are used for transmission of different numbers of symbols. In some aspects, the sequence of radio signals comprises one or more symbols. Each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols. The two symbols are transmitted using two different sets of subcarriers of the plurality of subcarriers. Each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

In some aspects, the method further comprises generating, at the mobile device, a set of samples of the sequence of radio signals, each sample of the set of samples being associated with a timestamp; processing, at the mobile device, the set of samples using a Fast Fourier Transform (FFT) processor to generate a sequence of amplitudes and phases of each subcarrier of the plurality of subcarriers; performing, at the mobile device, correlation operations on the sequence of amplitudes and phases to obtain one or more correlation products for each subcarrier of the plurality of subcarriers; determining, at the mobile device, an average of the one or more correlation products for each subcarrier of the plurality of subcarriers; obtaining, at the mobile device, a frequency domain vector based on the average of the one or more correlation products for each subcarrier of the plurality of subcarriers; and reconstructing, at the mobile device, a sequence of time-domain signals based on the frequency domain vector. Processing the sequence of radio signals using each of the plurality of subcarriers of the resource block to determine whether the sequence of radio signals represents a position measurement signal bitstream comprises using the sequence of time-domain signals to determine whether the sequence of radio signals represents a position measurement signal bitstream.

In some examples, a non-transitory computer readable medium is provided. The non-transitory computer readable medium comprises instructions that, when executed by a hardware processor, causes the hardware processor to perform the aforementioned methods.

In some examples, an apparatus is provided. The apparatus comprises means for performing the aforementioned methods.

BRIEF DESCRIPTION OF DRAWINGS

Non-limiting and non-exhaustive aspects are described with reference to the following figures.

Figure 1:
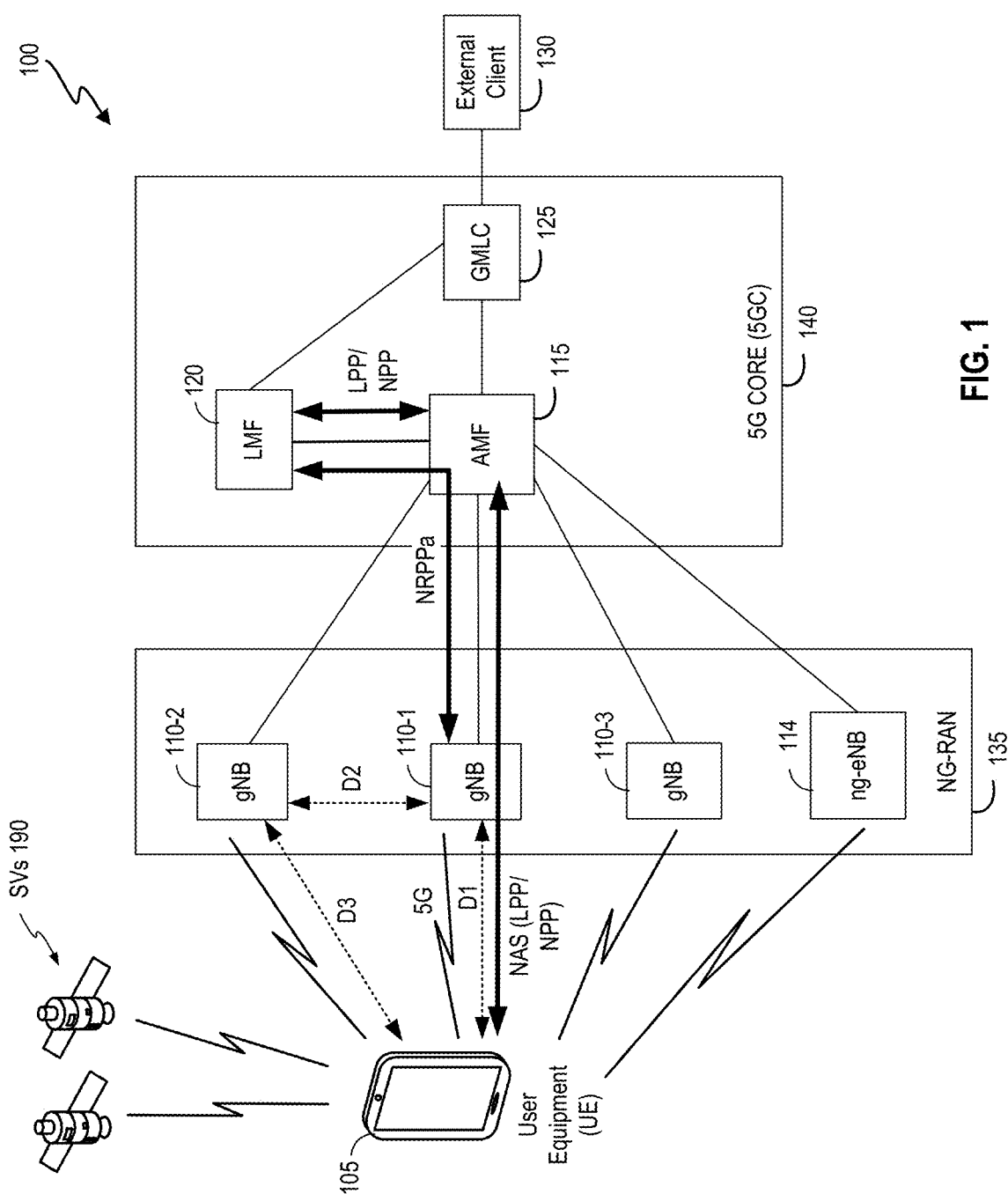
FIG. 1 is a diagram of a communication system that may utilize a 5G network to determine a position of a UE, according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA), Long Term Evolution (LTE), Positioning Protocol (LPP) and/or LPP Extensions (LPPe), Wi-Fi®, Global Navigation Satellite System (GNSS), and the like.

A UE may comprise a mobile device such as, for example, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios. There are many methods already known to determine an estimated position of the UE, including methods that involve communicating measurement and/or other information between the UE and an LS.

It is expected that fifth-generation (5G) standardization will include support for positioning methods based on or similar to Observed Time Difference Of Arrival (OTDOA) which is used in LTE network. With OTDOA, a UE measures time differences, referred to as Reference Signal Time Differences (RSTDs), between reference signals transmitted by one or more pairs of base stations. The reference signals may be signals that are intended only for navigation and positioning which may be referred to as Positioning Reference Signals (PRS) or may be signals intended also for serving cell timing and frequency acquisition which may be referred to as Cell-specific Reference Signals (CRS), Tracking Reference Signals (TRS), Channel State Information reference signal (CSI-RS), Primary and Secondary Synchronization Sequences (PSS/SSS), or Physical Broadcast Channel (PBCH) signals. If a UE is able to measure two or more RSTDs between two or more different pairs of base stations (or at least three cells). Each pair of neighbor base stations typically includes a common reference base station. The horizontal UE location can be obtained if the antenna locations and the relative timing of the base stations are known.

Currently, in a FDMA wireless network (e.g., Orthogonal FDMA (OFDMA) networks, Single-Carrier FDMA (SC-FDMA) networks, etc.), data can be encoded and transmitted using multiple subcarriers of different frequency bands. For example, the aforementioned reference and/or synchronization signals can be represented by a time-series of symbols. A base station can transmit each symbol by modulating a number of subcarriers within a symbol period for each symbol. A mobile device can receive radio signals including the modulated subcarriers, perform demodulation to obtain the symbols, and reconstruct the reference signal based on the symbols. The mobile station can include a peak detector to detect a peak of the reconstructed reference signal, and can determine a signal time corresponding to the detected peak to represent a time of reception/detection of the reference signal. Based on the difference in the times of reception/detection of reference signals from different base stations, the mobile device can determine the RSTDs.

A base station may be allocated a set of subcarriers as available wireless resources at a scheduled time to perform the transmission of radio signals. The information about the set of subcarriers available to perform the transmission of radio signals can be indicated in a resource block. With current technologies, the base station may use some (but not all) of the allocated subcarriers to transmit the symbols of the aforementioned reference and/or synchronization signals. Such arrangements may lead to inaccuracies in the reconstruction of the reference signal, which in turn affects the determination of the signal time. For example, frequency holes corresponding to the subcarriers that are not used in the transmission may be introduced in the frequency spectrum of a reference signal received at an UE. Due to aliasing, the frequency holes can lead to false peaks in the reconstructed reference signal. The false peaks may be erroneously detected by the peak detector as a real reference signal peak. Given that the false peaks occur at different signal times from the real reference signal peak, the erroneous detection can lead to inaccurate determination of the signal time corresponding to the reference signal peak, as well as inaccurate determination of the time of reception/detection of the reference signal. The accuracy of RSTD and location determination may be degraded as a result.

Techniques described herein below can address these issues to improve positioning methods in 5G network. Specifically, a base station may be allocated with a set of subcarriers in a resource block for downlink transmission, and the base station can be configured to use each subcarrier of the set of subcarriers to transmit a position measurement signal at a scheduled period of transmission. Each subcarrier can be modulated to form symbols representing a position measurement signal which can be used for time difference measurements in a similar way as how a position reference signal (or other reference signals) are used for RSTD measurements in an LTE network. A mobile device can receive radio signals including the modulated subcarriers, perform demodulation to obtain the symbols, and reconstruct the position measurement signal based on the symbols. Since each subcarrier of the set of subcarriers is used in the transmission of the position measurement signal, the presence of frequency holes in the position measurement signal can be avoided. The problem of aliasing and generation of false peaks, as well as the inaccuracies in timing determination due to the false peaks, can be mitigated as well.

Examples of the disclosed techniques also propose a position measurement signal structure that is uniform in frequency domain, in time domain, or both, to further simplify the detection of a position measurement signal at the mobile device. In some examples, a base station may be configured to modulate each subcarrier to carry information for a same number of symbols. With such arrangements, the position measurement signal structure can be uniform in frequency domain due to, for example, having uniform position measurement signal strength for each subcarrier, which enables a uniform processing method of each subcarrier. For example, from the correlation processing result for each subcarrier, information of same number of symbols can be extracted and processed to generate a frequency component of the position measurement signal, which can reduce implementation complexity of the receiver.

In some examples, a base station may also be configured to modulate the same set of subcarriers for each symbol. With such arrangements, the position measurement signal structure can be uniform in time domain due to, for example, having the same set of subcarriers being modulated at each symbol period to transmit a symbol, which also enables a uniform processing method for each symbol. For example, to extract each symbol, correlation operation can be performed for the same set of subcarriers at each symbol period when a symbol is transmitted, which can further reduce implementation complexity of the receiver.

1. Example Communication Systems

FIG. 1 is a diagram of a communication system 100 that may utilize a 5G network to determine a position of a UE 105 using OTDOA-based positioning methods, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may enable the UE 105 to communicate with an external client 130 (e.g. via elements of 5GC 140 not shown in FIG. 1 or possibly via Gateway Mobile Location Center (GMLC) 125) and/or enable the external client 130 to receive location information regarding the UE 105 (e.g. via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the NG-RAN 135 may comprise NR Node Bs which are more typically referred to as gNBs. In FIG. 1, three gNBs are shown—gNBs 110-1, 110-2 and 110-3, which are collectively and generically referred to herein as gNBs 110. However, a typical NG RAN 135 could comprise dozens, hundreds or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135 (not shown in FIG. 1)—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. a set of pre-determined position measurement signals) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support position methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), and/or other position methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As further illustrated in FIG. 1, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNBs 114, such as parameters defining PRS transmission from gNBs 110 and/or ng-eNB 114.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 110, ng-eNB 114 and/or a WLAN access point (AP). The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or Time Of Arrival (TOA)) for signals transmitted by UE 105, and/or may receive measurements obtained by UE 105, and may send the measurements to a location server (e.g. LMF 120) for computation of a location estimate for UE 105.

Information provided by a gNB 110 and/or ng-eNB 114 to the LMF 120 using NRPPa may include timing and configuration information for transmission of position measurement signals from the gNB 110 and/or location coordinates for the gNB 110. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more time differences measurements based on the position measurement signals transmitted within particular cells supported by particular gNBs 110 and/or the ng-eNB 114 (or supported by some other type of base station such as an eNB or WiFi AP). The time differences measurements may be similar to the RSTD measurement in LTE. For example, the time differences measurements may comprise measuring difference in the times of arrival at the UE 105 of a position measurement signal transmitted or broadcast by one gNB 110 and a similar signal transmitted by another gNB 110. The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

2. Example Signal Structures for LTE Position Measurement Signals

Figure 2A:
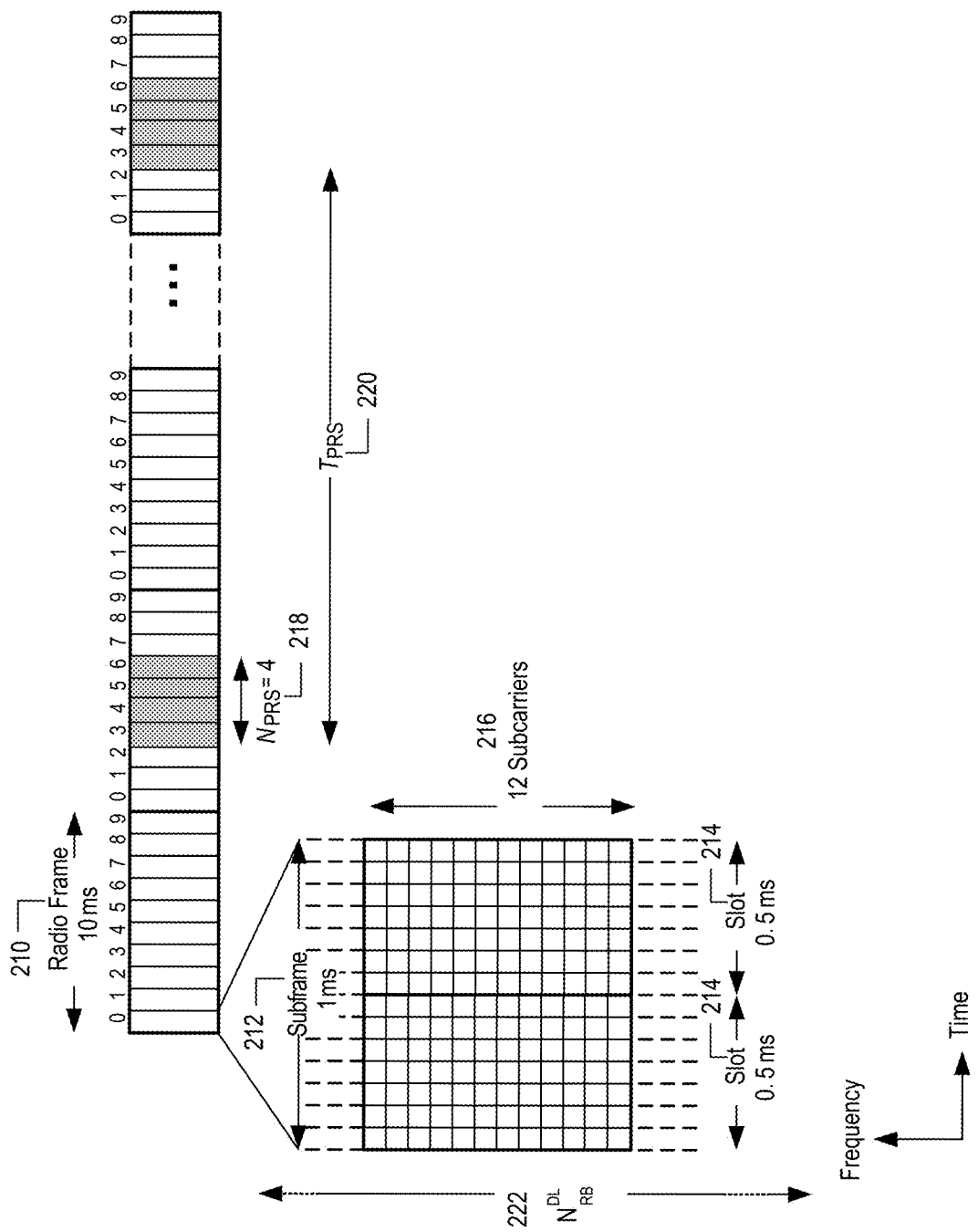
FIGS. 2A-2F represent signal structures for position measurement, according to some embodiments.

FIG. 2A is an example of the structure of a LTE subframe sequence of position measurement signals (e.g., PRS). A similar subframe sequence structure can also be used in the system of FIG. 1. In FIG. 2A, time is represented horizontally (e.g., on an X axis) with time increasing from left to right, while frequency is represented vertically (e.g., on a Y axis) with frequency increasing (or decreasing) from bottom to top, as illustrated. As shown in FIG. 2A, downlink and uplink LTE Radio Frames 210 can be 10 ms duration each.

For downlink Frequency Division Duplex (FDD) mode, Radio Frames 210 are organized into ten subframes 212 of 1 ms duration each. Each subframe 212 comprises two slots 214, each of 0.5 ms duration. Each slot of slots 214 may include seven symbol periods (in the case of normal cyclic prefix (NCP) as shown in FIG. 2A) or six symbol periods (in the case of extended cyclic prefix (ECP)), with each symbol period for transmission of a symbol. Up to 12 symbols (in the case of ECP) or 14 symbols (in the case of NCP) can be transmitted within subframe 212. The symbols can be used to represent, for example, a PRS signal. It is understood that in a 5G network, the number of symbols in one slot can include a different number (other than six or seven) of symbol periods, and a pre-determined pattern of the symbols transmitted in the symbol periods can represent a position measurement signal in the 5G network.

In the frequency domain, the available bandwidth may be divided into uniformly spaced orthogonal subcarriers 216. For example, for a normal length cyclic prefix using 15 kHz spacing, subcarriers 216 may be grouped into a group of 12 subcarriers. Each grouping, which comprises 12 subcarriers 216, in FIG. 2A, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration, is indicated as $N_{RB}^{DL}$ 222. For example, for a 3 MHz channel bandwidth in the above example, the number of available resource blocks on each channel 222 is given by $N_{RB}^{DL}=15$. It is understood that in a 5G network, a resource block can include a different number (other than 12 or 15) of subcarriers, and the subcarriers can occur a different channel bandwidth than, for example, the 3 MHz channel bandwidth discussed above.

A position reference signal (PRS), which has been defined in 3GPP LTE Release-9 and later releases, may be transmitted by an eNB after appropriate configuration (e.g., by an Operations and Maintenance (O&M) server). A PRS may be transmitted in downlink transmissions as a broadcast signal directed to all UEs within a radio range from the eNB, and the PRS can be used by the UEs as a position measurement signal for position determination. A PRS can be transmitted in special positioning subframes that are grouped into positioning occasions. For example, in LTE, a PRS positioning occasion can comprise a number NPRS of consecutive positioning subframes where the number NPRS may be between 1 and 160 (e.g. may include the values 1, 2, 4 and 6 as well as other values). The PRS positioning occasions for a cell supported by an eNB 170 may occur periodically at intervals, denoted by a number 7PRS, of millisecond (or subframe) intervals where 7PRS may equal 5, 10, 20, 40, 80, 160, 320, 640, or 1280. As an example, FIG. 2A illustrates a periodicity of positioning occasions where NPRS equals 4 and 7PRS is greater than or equal to 20. In some embodiments, 7PRS may be measured in terms of the number of subframes between the start of consecutive positioning occasions.

Moreover, in FIG. 2A, each subcarrier of subcarriers 216 can be paired with a symbol period of slots 214, and the pair forms a resource element. A symbol can be generated by converting a digital bitstream into a complex number with an in-phase (I) and quadrature (Q) component, which can then be used to modulate one or more subcarriers. For example, in a case of binary phase shift keying (BPSK), a bit value can be mapped to the I and Q component based on the following table:

TABLE 1

| b(i) | I | Q |
|---|---|---|
| 0 | $1/\sqrt{2}$ | $1/\sqrt{2}$ |
| 1 | $-1/\sqrt{2}$ | $-1/\sqrt{2}$ |

For example, to represent a bit value of 0, one or more subcarriers can have their in-phase frequency components multiplied with a value of $1/\sqrt{2}$ and their quadrature components multipled also with a value of $1/\sqrt{2}$. Notice that BPSK is provided here as an illustrative example, and a PRS bitstream can be converted into in-phase and quadrature-phase symbols using other modulation schemes such as quadrature phase shift keying (QPSK), quadrature amplitude modulation (QAM), etc. A position measurement signal in the 5G network can also include a bitstream which can be converted into in-phase and quadrature-phase symbols using these modulation schemes.

Figure 2B:
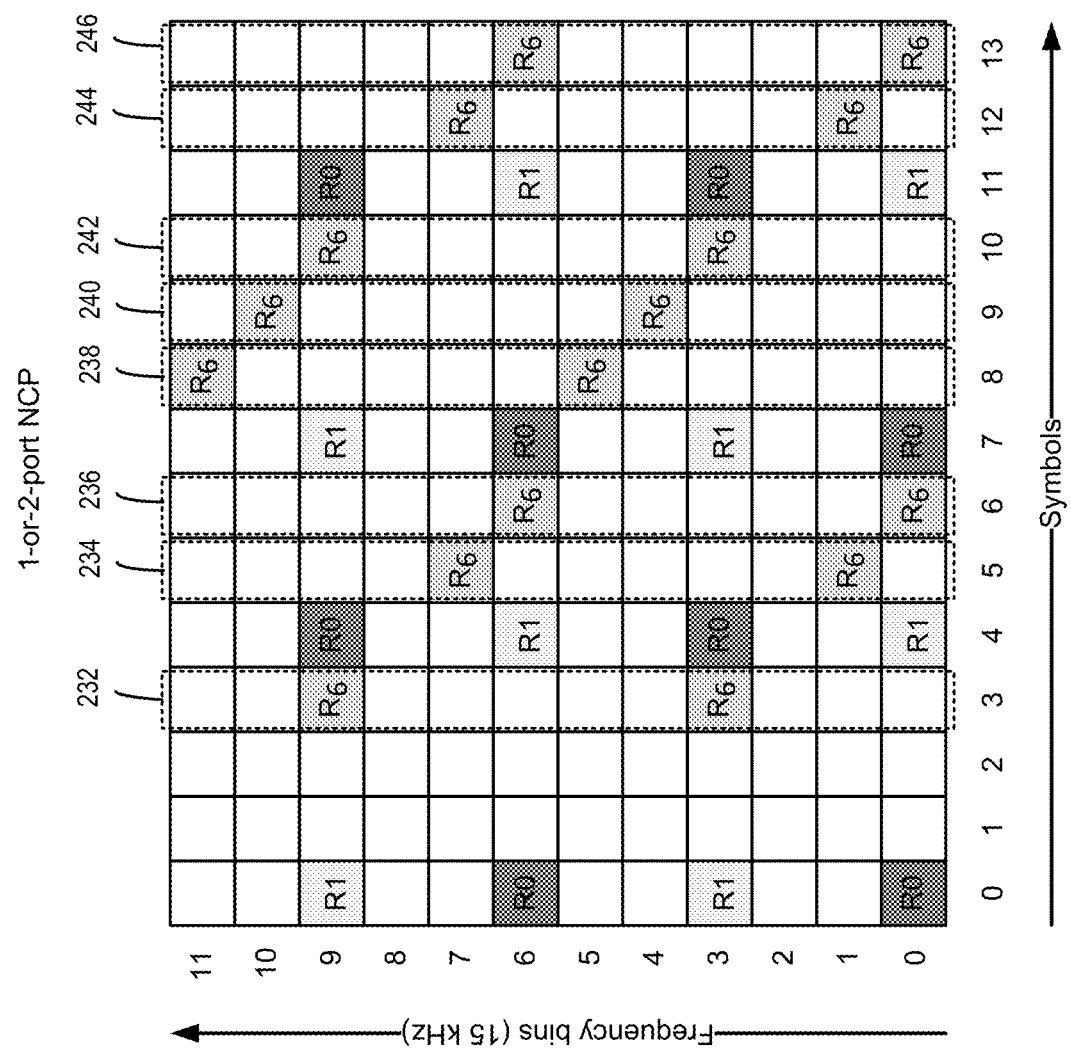

Through a resource element mapping mechanism, each bit of a PRS bitstream (and/or a position measurement signal bitstream in the 5G network) can be mapped to a set of subcarriers within the set of available subcarriers (e.g., frequency bins 0-11 of FIG. 2B). For example, a sequence of radio signals representing a bit of a PRS bitstream (and/or a position measurement signal bitstream in the 5G network) can comprise the set of available subcarriers defined according the resource element mapping mechanism being modulated to represent the bit. Together with the modulation information (e.g., the in-phase and quadrature values to be multiplied with each of the set of subcarriers), a symbol in frequency domain can be created. The frequency domain for each symbol can indicate the amplitude and phase of each subcarrier within the set of available subcarriers as a function of frequency. The frequency domain information of each symbol can be fed into an Inverse Fast Fourier Transform (IFFT) processor, which can compute the time-domain data of the in-phase and quadrature components of each of the modulated subcarriers. The time-domain data can then be transmitted as radio signals.

Figure 2C:
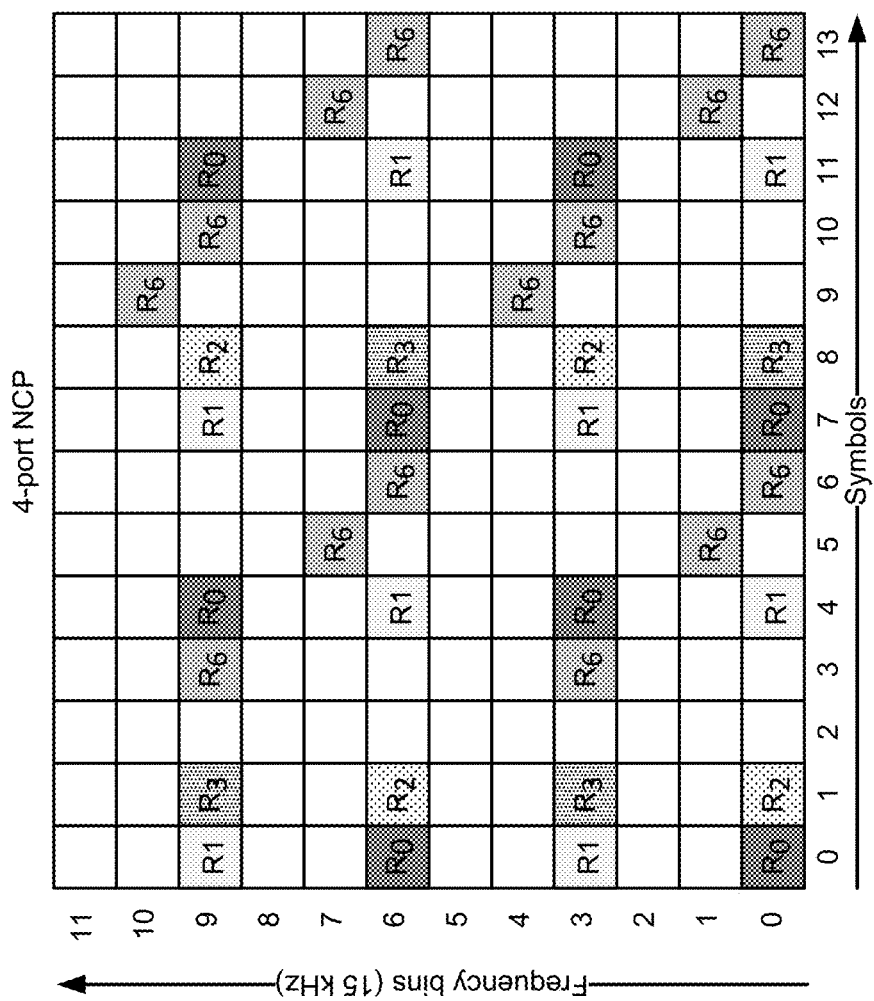
Figure 2D:
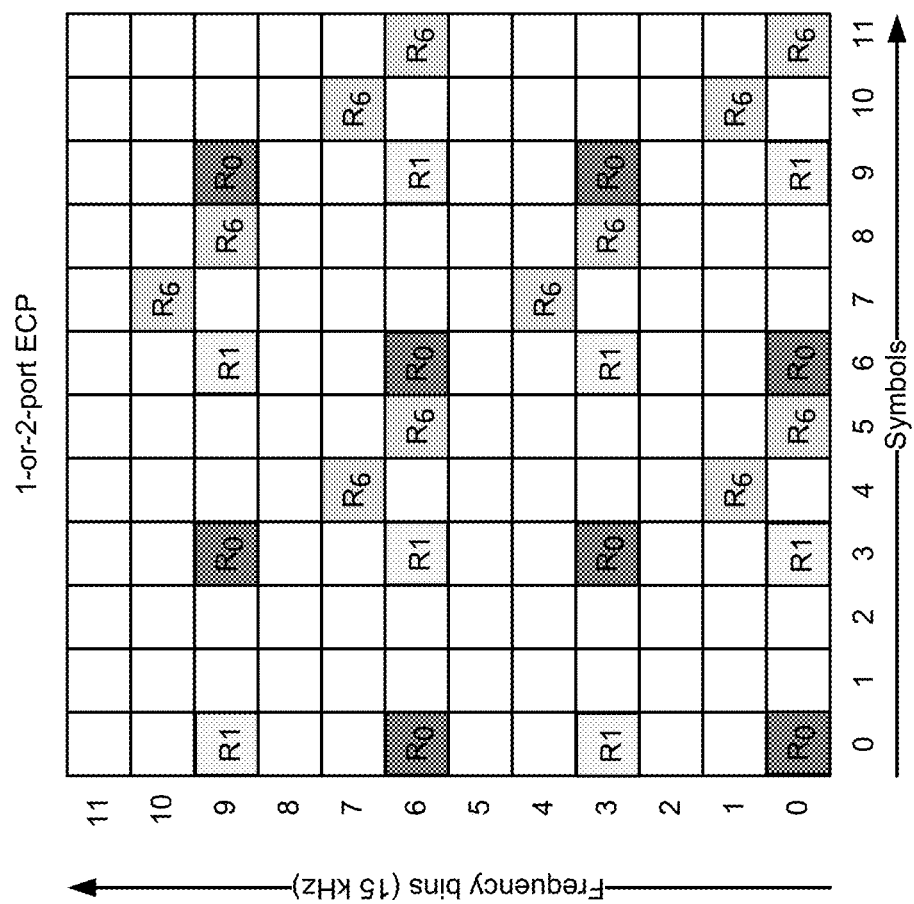
Figure 2E:
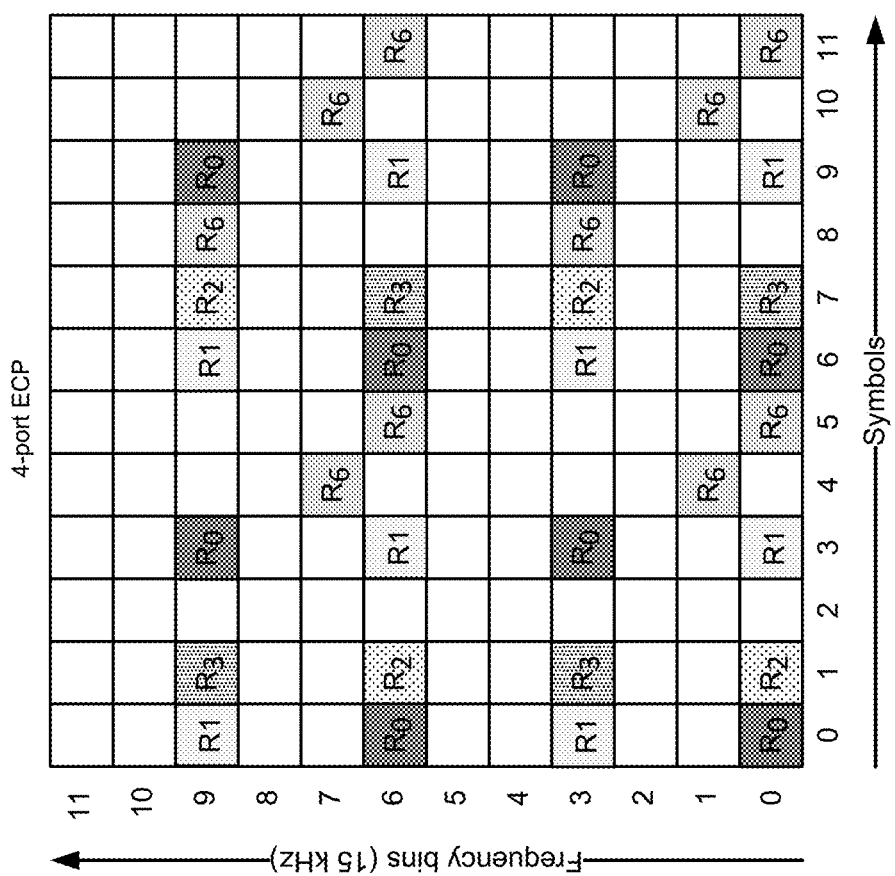

FIGS. 2B-2E illustrate examples of a resource block. The examples of the resources blocks can be for PRS transmission in LTE or for transmission of a position measurement signal in the 5G network. FIG. 2B illustrates an example of a resource block with normal cyclic prefix (NCP) for transmission with a single antenna or two antennae (1-or-2 port). FIG. 2C illustrates an example of a resource block with normal cyclic prefix (NCP) for transmission with four antennae (4 port). FIG. 2D illustrates an example of a resource block with extended cyclic prefix (ECP) for transmission with a single antenna or two antennae (1-or-2 port), whereas FIG. 2E illustrates an example of a resource block with extended cyclic prefix (ECP) for transmission with four antennae (4 port). In each of FIGS. 2B-2E, resource elements labelled "$R_6$" can be used for transmission of a PRS signal in LTE, whereas resource elements labelled "$R_0$" and "$R_1$" are used for transmission of other signals (e.g., cell reference signal (CRS)) in LTE.

In the example of FIG. 2B, a PRS signal (in an LTE network) may include a modulation pattern of subcarriers 0, 1, 3, 4, 5, 6, 7, 9, 10, and 11 at different symbol periods to form symbols 232, 234, 236, 238, 240, 242, 244, and 246. For example, symbol 232 can be transmitted using subcarrier bins 3 and 9 at symbol period 3. Symbol 234 can be transmitted using subcarrier bins 1 and 7 at symbol period 5. Symbol 236 transmitted using subcarrier bins 0 and 6 at symbol period 6. Symbol 238 can be transmitted using subcarrier bins 5 and 11 at symbol period 8. Symbol 240 can be transmitted using subcarrier bins 4 and 10 at symbol period 9. Symbol 242 can be transmitted using subcarrier bins 3 and 9 at symbol period 10. Symbol 244 can be transmitted using subcarrier bins 1 and 7 at symbol period 12. Symbol 246 can be transmitted using subcarrier bins 0 and 6 at symbol period 13. Different base stations (of different cells) may use different resource elements patterns for transmission of PRS signals to avoid interference among PRS signals from different base stations, and to enable a mobile device to distinguish PRS signals from multiple base stations to perform RSTD determination. As an illustrative example, to transmit a PRS signal using 1-or-2 port NCP, a different base station may use different sets of subcarrier bins for symbols 232, 234, 236, 238, 240, 242, 244, and 246 from the sets of subcarrier bins shown in FIG. 2B. The sets of subcarrier bins can be determined by, for example, a resource element mapping function that accepts a physical cell identifier (PCI).

A mobile device can receive the radio signals comprising the time-domain data symbol, and extract the PRS bitstream from the radio signals. For example, the mobile device can use an analog-to-digital converter (ADC) to generate samples of the radio signals, and process the samples using a forward FFT processor to obtain a frequency domain representation of each symbol. Each tap of the FFT output can correspond to one of the modulated subcarriers. An FFT output can correspond to a set of resource elements represented by in-phase and quadrature components of the modulated subcarriers. The mobile device can obtain a descrambling sequence generated based on the resource element mapping information, which includes a complex conjugate of each of the modulated subcarriers for each symbol, and perform correlation operation on the FFT output using the descrambling sequence. For each modulated subcarrier, the correlation operation can generate one or more correlation products for each of the symbols that includes a resource element corresponding to the modulated subcarrier. The correlation products for each modulated subcarrier can represent the symbol periods in which the subcarrier is modulated to represent the symbols in the symbol periods. For each modulated subcarrier, the correlation products can be averaged to form a frequency domain vector, with each entry of the frequency domain vector representing the amplitude and the phase of a subcarrier bin of a resource block. The amplitude and phase information included in the frequency domain vector can be processed using an IFFT processor to generate a time-domain Channel Energy Response (CER). The CER data can then be demodulated to recover the PRS bitstream.

Referring back to FIGS. 2B-2E, it can be seen that a base station does not use each and every subcarrier allocated for the downlink transmission to transmit the subframes containing the PRS signals in an LTE network. For example, in the example of FIG. 2B, frequency bins 2 and 8 are not used. In the examples of FIG. 2C and FIG. 2D, frequency bins 2, 5, 8, and 11 are not used. In the example of FIG. 2E, frequency bins 2, 4, 5, 8, 10, and 11 are not used.

The non-use of subcarriers in the downlink transmission can lead to periodic and discrete frequency holes in the frequency domain vector generated by the mobile device. For example, referring to the example of FIG. 2B, a frequency domain vector for a PRS signal in an LTE network may include holes every 6 subcarriers. The periodic and discrete frequency holes in the frequency domain vector can lead to the time-domain CER including periodic and discrete alias terms. This can be due to the property of Fourier Transform, where periodic and discrete signals in frequency domain become discrete and periodic in the time domain after being processed by inverse Fourier Transform.

Figure 2F:
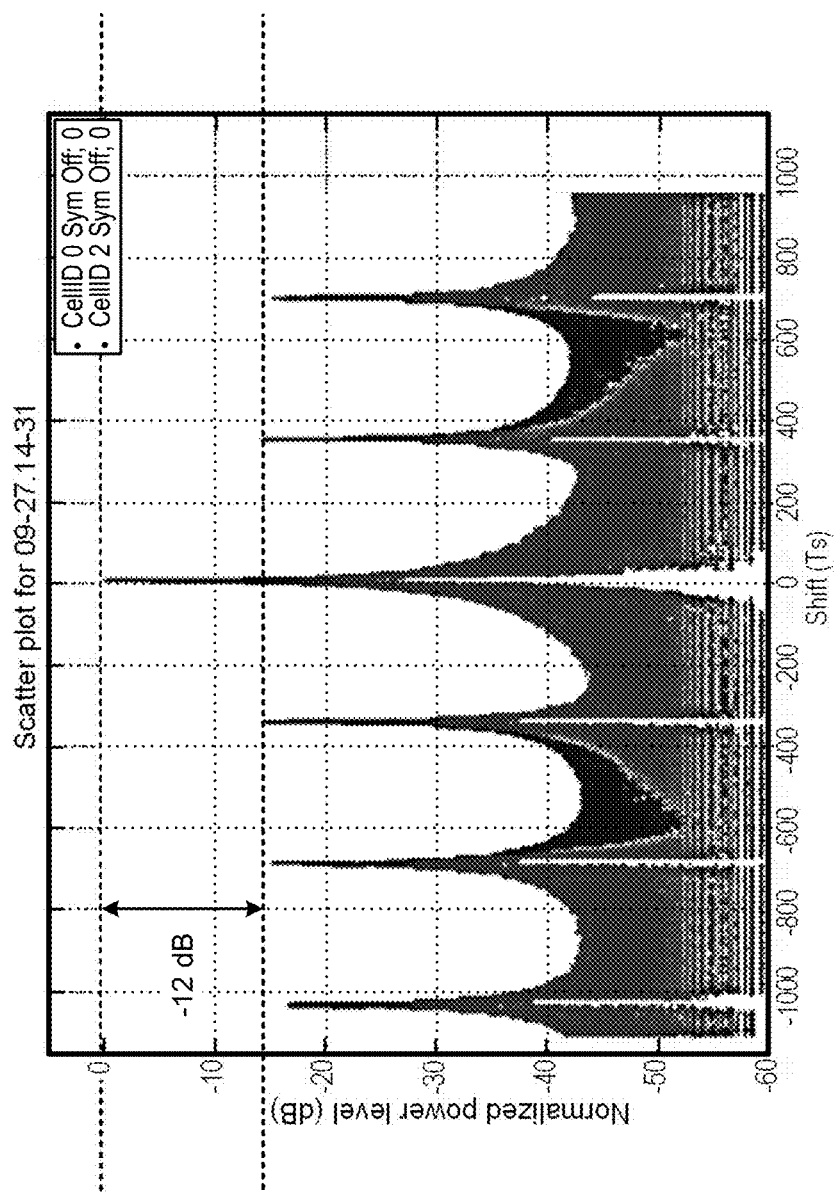

In an LTE network, the periodic alias terms can lead to false PRS signal being used for RSTD measurement. FIG. 2F illustrates an example of a PRS signal reconstructed from downlink transmission using the example resource block of FIG. 2B. The PRS signal includes a true peak at timestamp T=0 Ts. Here, "Ts" may be a unit of the time scale and represent 32.6 nanoseconds (ns). In FIG. 2F, other false peaks may occur at, for example, timestamps T=−341.33 Ts and +341.33 Ts. The power level between the true peak at T=0 Ts and the false peaks at timestamp T=−341.33 Ts is 12 dB. A detector designed to detect a signal with a signal peak above −12 dB as the PRS signal may incorrectly regard the false peaks as the true peaks, and use the timestamp T=−341.33 Ts as the time of receiving/detecting the PRS signal, rather than the timestamp T=0Ts. Based on the incorrect timing information, the mobile device may generate inaccurate RSTD measurements.

3. Example Signal Structures for Position Measurement Signals for 5G Network

To mitigate the aliasing effects, a base station in a 5G network (e.g., a gNBs 110 and ng-eNB 114 of FIG. 1) may be configured to use each subcarrier of a resource block to transmit a position measurement signal, to avoid introducing frequency holes in the frequency domain vector of the signal. Reference is now made to FIG. 3A-FIG. 5D, each of which illustrates an example of resource element mapping in a resource block for transmission of a position measurement signal in a 5G network to mitigate the aliasing effects. The position measurement signal can be transmitted during a scheduled transmission occasion using the examples of resource element mapping shown in FIG. 3A-FIG. 5D. In each of the illustrative examples of FIG. 3A-FIG. 5D, it is assumed that normal cyclic prefix is used, each resource block can have up to 14 symbols, and 12 subcarrier bins are allocated. It is understood that the examples of the resource blocks can be applicable for other configurations of a resource block including, for example, extended cyclic prefix are used (such that a resource block includes up to 12 symbols), a different channel bandwidth which changes the number of available subcarriers, etc.

Figure 3B:
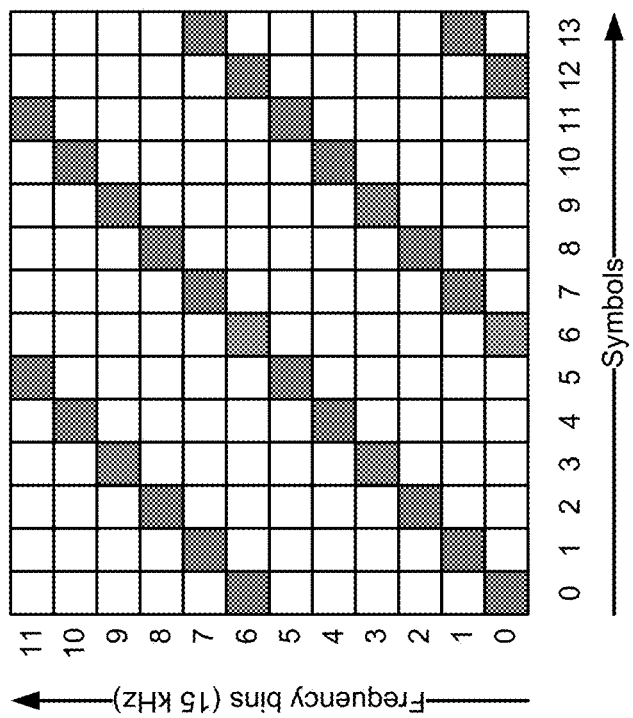
FIGS. 3A-5D represent resource element mapping patterns for wireless position measurement signals, according to some embodiments.
Figure 3A:
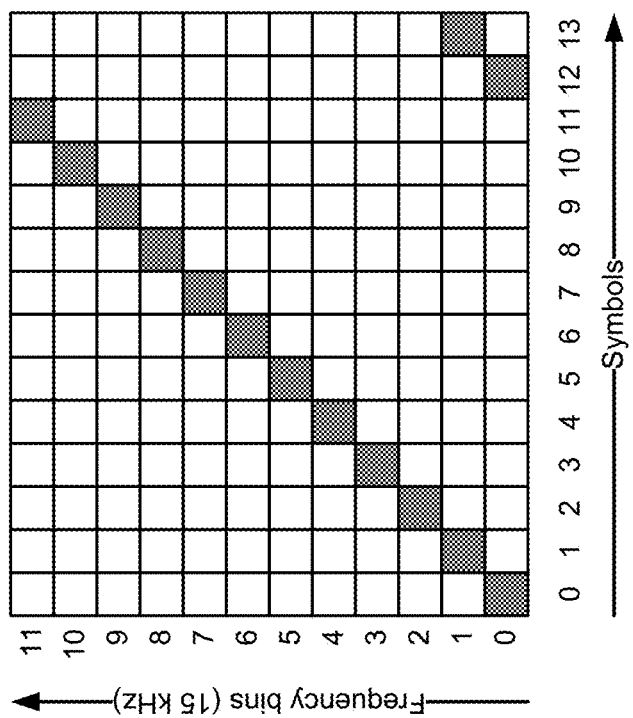
Figure 3D:
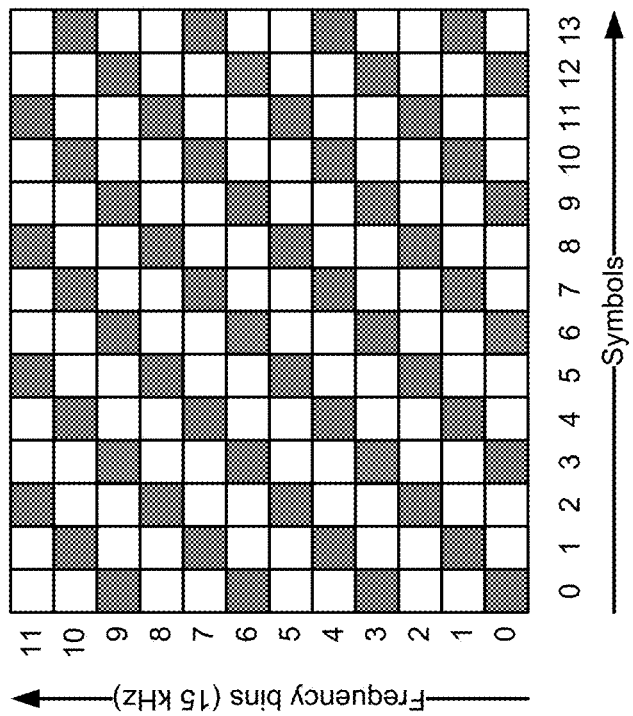
Figure 3C:
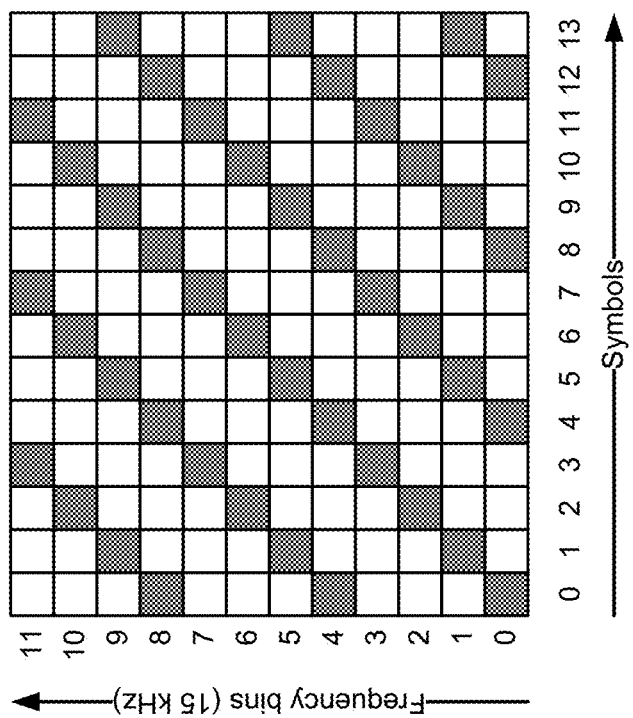

In the example of FIG. 3A, a position measurement signal can include 14 symbols of the resource blocks, with each symbol using one of the subcarriers in the resource block, and each subcarrier is used at least once (and some are used twice, such as subcarrier bins 0 and 1) for the position measurement signal transmission. In the example of FIG. 3B, a position measurement signal can also include 14 symbols, with each symbol using two of the subcarriers in the resource block, and each subcarrier is used at least twice (and some are used for three times, such as subcarrier bins 0, 1, 6, and 7) for the position measurement signal transmission. In the example of FIG. 3C, a position measurement signal can also include 14 symbols, with each symbol using three of the subcarriers in the resource block, and each subcarrier is used at least three times (and some are used four times, such as subcarrier bins 0, 1, 4, 5, 8, and 9) for the PRS signal transmission. In the example of FIG. 3D, a position measurement signal can also include 14 symbols, with each symbol using four of the subcarriers in the resource block, and each subcarrier is used at least four times (and some are used five times, such as subcarrier bins 0, 1, 3, 4, 6, 7, 9, and 10) for the position measurement signal transmission.

In each of FIGS. 3A-3D, a repeating pattern of resource elements mapping among the symbols can be formed, and some of the symbols have identical sets of subcarriers. For example, referring to FIG. 3A, both symbols 0 and 12 use subcarrier bin 0, whereas both symbols 1 and 13 use subcarrier bin 1. Also, referring to FIG. 3B, the subcarrier bin pattern for symbols 0-5 repeats for symbols 6-11. The use of repeating patterns of resource elements mapping may be desirable in resource element allocations among base stations for transmissions of a position measurement signal. For example, the resource element mapping can be based on one or more equations that outputs the frequency bins based on a symbol number. The equations can be made available to both the base station and the mobile station to determine the subcarriers used for each symbol. With such arrangements, the resource elements mapping can become more predictable and uniform, while the operations at both the base station and at the mobile station can be simplified. For example, the base station needs not transmit the full resource element mapping (e.g., in the form of Physical Downlink Control Channel (PDCCH) in LTE) to the mobile station to inform the mobile station which subcarrier is used for each symbol.

As an illustrative example, the resource element mapping of FIG. 3C can be represented by the following equations:

$$\text{Subcarrier\_bin0} = \text{symbol\_number} \bmod 4 \quad \text{(equation 1)}$$

$$\text{Subcarrier\_bin1} = \text{symbol\_number} \bmod 4 + 4 \quad \text{(equation 2)}$$

$$\text{Subcarrier\_bin2} = \text{symbol\_number} \bmod 4 + 8 \quad \text{(equation 3)}$$

Here, subcarrier_bin0, subcarrier_bin1, and subcarrier_bin2 refer to the subcarrier bin number of, respectively, a first subcarrier, a second subcarrier, and a third subcarrier used for transmission of a symbol associated with a particular symbol number (or symbol period). The subcarrier bin numbers can be determined based by performing a modulo operation (mod) on the symbol number by four. For symbols with symbol numbers 0, 4, 8, and 12 (to be transmitted in respectively symbol periods 0, 4, 8, and 12), subcarrier bins 0, 4, and 8 can be obtained from equations 1-3. For symbol number 1, subcarrier bins 1, 5, and 9 can be obtained from the equations. The equations can also be updated for different base stations to ensure different subcarriers are used during the same symbol period to reduce interference. For example, for a different base station, the resource element equations can be updated as follows:

$$\text{Subcarrier\_bin0} = \text{symbol\_number} \bmod 4 + 1 \quad \text{(equation 4)}$$

$$\text{Subcarrier\_bin1} = \text{symbol\_number} \bmod 4 + 4 \quad \text{(equation 5)}$$

$$\text{Subcarrier\_bin2} = \text{symbol\_number} \bmod 4 + 9 \quad \text{(equation 6)}$$

With equations 4, 5, and 6, a different base station can transmit symbol number 0 with subcarrier bins 1, 5, and 9 (different from subcarrier bins 0, 4, and 8 from equations 1-3), to avoid interference.

Figure 3E:
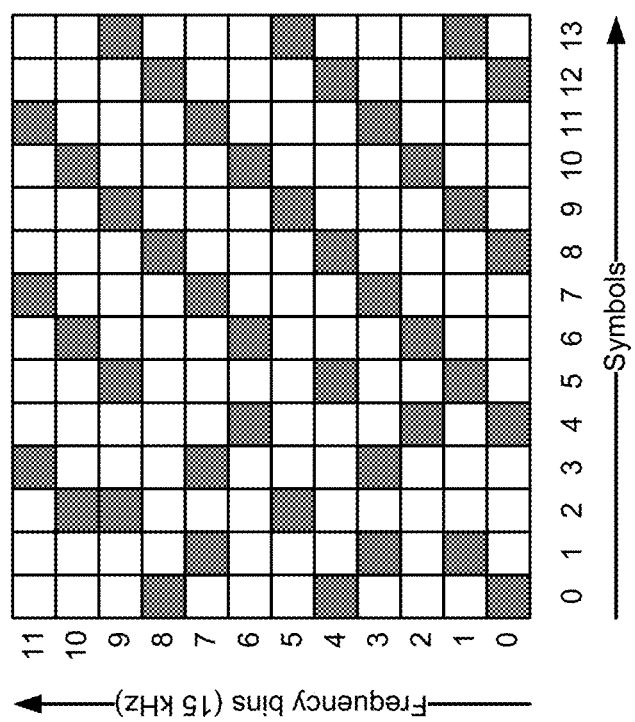

As described above, a repeating pattern of resource elements mapping among the symbols is formed in the examples of FIGS. 3A-3D. However, such repeating pattern is not always required to use each subcarrier of a resource block to transmit a position measurement signal to avoid introducing frequency holes in the frequency domain vector of the signal. FIG. 3E illustrates an example of resource elements mapping among the symbols which is different from the examples of FIGS. 3A-3D. The example of FIG. 3E does not have a pattern of resource elements mapping that repeats itself among the fourteen symbols. However, using the pattern of resource elements mapping, each subcarrier is also used at least once for the position measurement signal transmission, and the aforementioned aliasing effects can be mitigated.

Figure 4B:
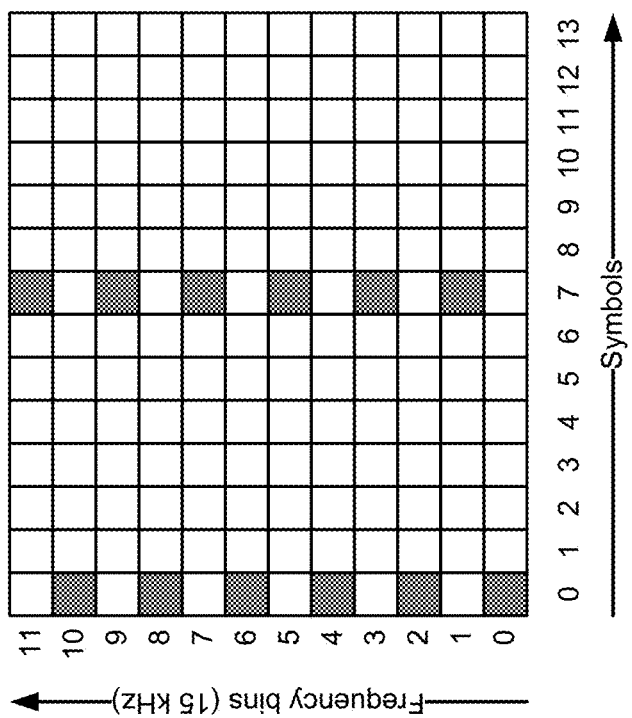
Figure 4A:
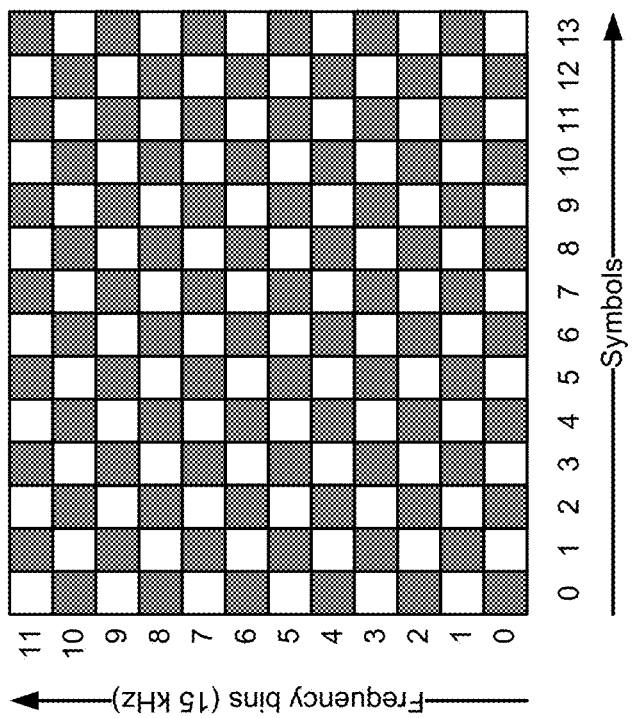
Figure 4C:
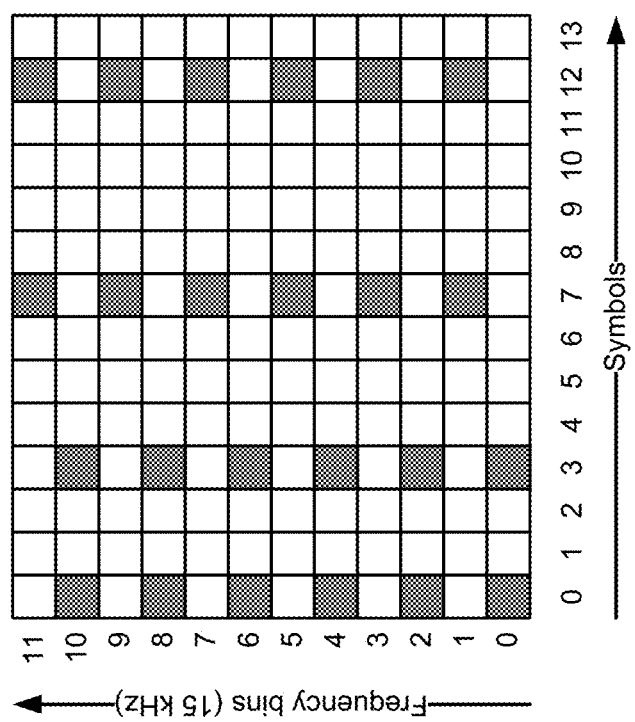

FIGS. 4A-4C illustrate another set of examples of resource element mapping in a resource block for position measurement signal transmission in a 5G network. Unlike the examples of FIGS. 3A-3E, in each example of FIGS. 4A-4C, each subcarrier is used for the same number of times and for transmission of the same number of symbols. For example, in FIG. 4A, the position measurement signal includes two symbols (symbol number 0 and symbol number 7), each symbol uses a different set of six subcarriers, and each subcarrier is used once and for transmission of one of the two symbols. Moreover, in FIG. 4B, the position measurement signal includes 14 symbols, each symbol uses a set of six subcarriers (with some symbols using the same set of six subcarriers and some symbols using different sets of six subcarriers), and each subcarrier is used seven times and for transmission of seven symbols. Further, in FIG. 4C, the position measurement signal includes four symbols, each symbol uses a set of six carriers, and each subcarrier is used twice and for transmission of two symbols.

In the resource elements mapping examples of FIGS. 4A-4C, the same number of resource elements is used in each subcarrier for the transmission of symbols, which enables uniform processing of each subcarrier for symbol extraction. For example, as discussed above, as a result of correlation processing, one or more products can be generated for each modulated subcarrier, and the products will be averaged to form the frequency domain vector for PRS signal reconstruction. By using the same number of resource elements for each subcarrier (e.g., one resource element in the example of FIG. 4A, seven resource elements in the example of FIG. 4B, two resource elements in the example of FIG. 4C), the same number of products can be generated from the correlation operations for each subcarrier, and the same number of products can be averaged for each subcarrier to compute a corresponding frequency component of the position measurement signal. Moreover, each subcarrier can have uniform signal power and signal to noise ratio, which also allows uniform signal processing (e.g., same amplification gain, same noise processing, etc.) for each subcarrier. All these allow more uniform processing of each subcarrier, which in turn can reduce implementation complexity.

FIGS. 5A-5D illustrate another set of examples of resource element mapping in a resource block for transmission of a position measurement signal in a 5G network. In each example of FIGS. 5A-5D, each symbol uses each subcarrier of a resource block, resulting in each symbol using the same set of subcarriers for transmission. The position measurement signal in these examples can include one symbol (as in FIG. 5A), two symbols (as in FIG. 5B), seven symbols (as in FIG. 5C), four symbols (as in FIG. 5D), etc. The resource elements mapping in FIGS. 5A-5D enables not only uniform processing of each subcarrier (since each subcarrier is used for transmission of same number of symbols) but also uniform processing of each symbol. For example, for each subcarrier, the correlation operation can use the same sequence of complex conjugate values representing the same set of resource elements at the same symbol periods. Compared with the examples of FIGS. 4A-4C, where different sequences of complex conjugate values representing different sets of resource elements at different symbol periods may be used for correlation operations of different subcarriers, the arrangements in FIGS. 5A-5D allows even more uniform processing of the subcarriers, which can further reduce implementation complexity.

4. Selection of Signature Structures

In addition, a signature structure can also be selected to improve signal qualities. The selection can be based on one or more metrics related to an operation environment. The metrics can be related to various sources of signal quality degradation in the operation environment. Based on the metrics, a signal structure can be selected for transmission of the position measurement signals to adapt to the operation environment, and to improve the qualities of the signals received at a UE.

a. Doppler Sensitivity

The qualities of position measurement signals received at a UE (e.g., defined according to Channel Energy Response (CER), Channel Impulse Response (CIR), etc.) can be affected by Doppler effect when the UE is in motion. The Doppler effect can introduce an observed phase shift in the signal received at the UE. The observed phase shift can introduce error in the time-domain measurements of signal qualities at the UE. For example, a signal can be measured to have an amplitude A and a phase of zero degrees at a first instance, and the signal can be measured to have the amplitude A and phase of 180 degrees due to the phase shift caused by Doppler effect. The two measurements can be combined to provide a measurement of zero (A−A) when, absent the Doppler effect, the combined measurement would have been 2A (A+A).

The observed phase shift can be related to a multiplication product between the velocity of the UE and a duration of a measurement period. Therefore, a shorter duration of measurement period can be desirable to introduce smaller observed phase shift, and/or to allow a larger UE velocity (and to put less restriction on the movement of the UE) for an error budget corresponding to a target degree of observed phase shifts. In a case where Doppler effect dominates the errors or uncertainties in position measurement signals, signal structures can allow shorter duration of measurement periods and can be used to provide positional measurement.

As an illustrative example, two cell stations may transmit signals of a pre-determined frequency to a moving UE. Due to Doppler effect, the UE may observe a frequency difference in the signals transmitted by the two cell stations. Assuming that the transmitters of both cell stations are frequency-locked, the worst-case frequency difference can be a function of the velocity of the UE, speed of light, and frequency of transmission of the signals, as follows:

$$\Delta F_{Doppler} = \frac{2 \cdot \Delta V_{UE}}{c} \cdot f_0 \quad \text{(Equation 7)}$$

In Equation 7, parameter $\Delta F_{Doppler}$ can be the observed frequency shift at the UE, parameter c can be the speed of light, parameter $\Delta V_{UE}$ can be the velocity of the UE with respect to the cell stations, whereas parameter $f_0$ can be the frequency of transmission of the signals. The observed frequency shift can be accumulated with a signal measurement window period to become a phase shift in the observed signals at the UE. Assuming the velocity of the UE is constant, the phase shift can be determined based on the following equation:

$$\Delta \vartheta = 2 \cdot \pi \cdot \frac{2 \cdot \Delta V_{UE}}{c} \cdot f_0 \cdot T0 \quad \text{(Equation 8)}$$

In Equation 8, parameter $\Delta \vartheta$ can be the observed phase shift, parameter c can be the speed of light, parameter $\Delta V_{UE}$ can be the velocity of the UE with respect to the cell stations, parameter $f_0$ can be the frequency of transmission of the signals, whereas T0 can be the time duration of the signal measurement window period. As indicated in Equation 8, a smaller duration of T0 (for a given combination of $\Delta V_{UE}$, $f_0$, and c) can lead to a smaller phase shift $\Delta \vartheta$, or can allow for a larger UE velocity $\Delta V_{UE}$ for a given target phase shift $\Delta \vartheta$. A signature structure can be selected to minimize a metric comprising, for example, the observed phase shift, and/or to maximize the allowed UE velocity for a given observed phase shift budget. In both cases, a signal structure can be selected to provide a smaller measurement window period. One example of such signal structure may include the signal structures of FIGS. 5A-5D. For example, in each of FIGS. 5A-5D, all of the 12 sub-carriers in a resource block are used to represent a symbol. For example, the signal structure in FIG. 5A uses all of the 12 sub-carriers to represent a symbol, and one symbol is represented in the resource block, whereas FIGS. 5B-5D includes multiple symbols, with each symbol being represented by the same 12 sub-carriers. In all of these examples, each symbol is represented by continuous frequency spectrum (since all of the 12 sub-carriers are used) without any frequency hole within the spectrum. Therefore, position measurement can be performed based on a single symbol in the signal structures in FIGS. 5A-5D within a single symbol period.

In contrast, the signal structures of FIG. 3A requires a combination of symbols 0-11 to obtain a continuous frequency spectrum within the resource block. Given that symbols 0-11 span 12 symbol periods, the signal structures of FIG. 3A may require a measurement period that is 12 times the measurement period for the signal structures of FIGS. 5A-5D, and can lead to a larger observed phase shift $\Delta \vartheta$. Moreover, for a given target phase shift $\Delta \vartheta$, the signal structures of FIG. 3A allows a UE velocity that is 1/12 of what is allowed by the signal structures of FIGS. 5A-5D. Therefore, in a case where Doppler effect dominates the errors or uncertainties in the position measurement signals (e.g., due to high speed movement of the UE), the signal structures of FIGS. 5A-5D may be preferred over the signal structures of FIG. 3A.

b. Time-Variant Fading Resistance

The qualities of position measurement signals received at the UE can also be affected by timing-varying channel fading effect experienced by the UE. Channel fading effect may vary with respect to time due to, for example, a change in the location of the UE, a change in the environment the UE is located, etc., such that the UE can experience different degrees of channel fading at different times. The time-varying channel fading effect can introduce a time-varying component that can contaminate the position measurement signals such that the UE may, for example, detect false peaks of position measurement signals and deduce incorrect timing information.

To minimize the likelihood of error of false detection of position measurement signals given a certain level of timing-varying channel fading, it is advantageous to use a signal structure such that not only that all of the subcarriers are used for the transmission (to avoid frequency hole) but also that the subcarriers are used for transmissions at different point(s) in time. With such arrangements, the effect of time-varying fading can be mitigated as correlation processing is performed for each subcarrier and the correlation outputs are then averaged, which can also average out and reduce the time-varying fading component. Moreover, the signal structure can include a repetitive transmission pattern of subcarriers within a resource block, where each repetitive transmission pattern can be separated by a relatively large time gap. The large time gap can reduce the correlation in the channel fading effect between the repetitive transmission patterns, which can further improve the reduction of the time-varying fading component by averaging.

Figure 5A:
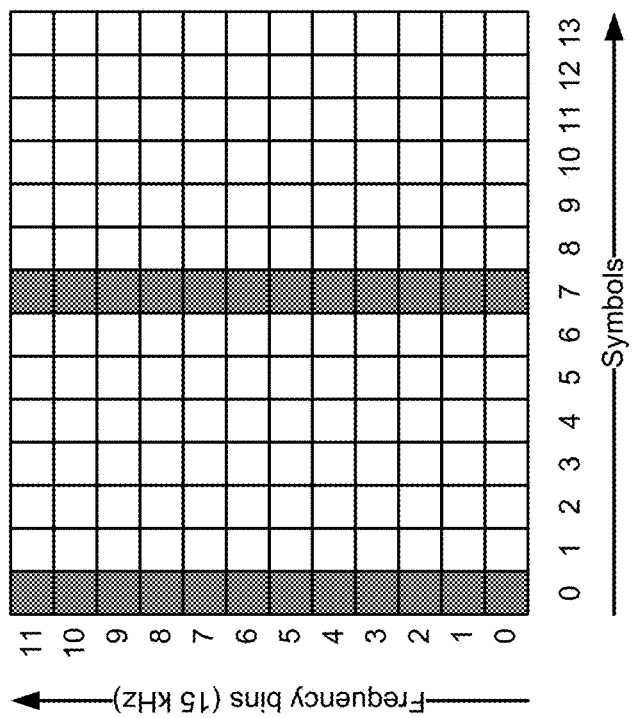
Figure 5B:
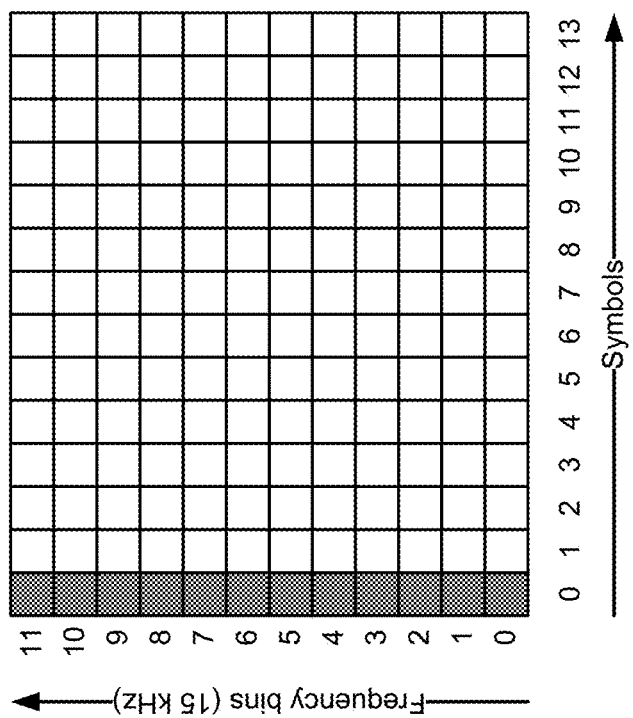
Figure 5C:
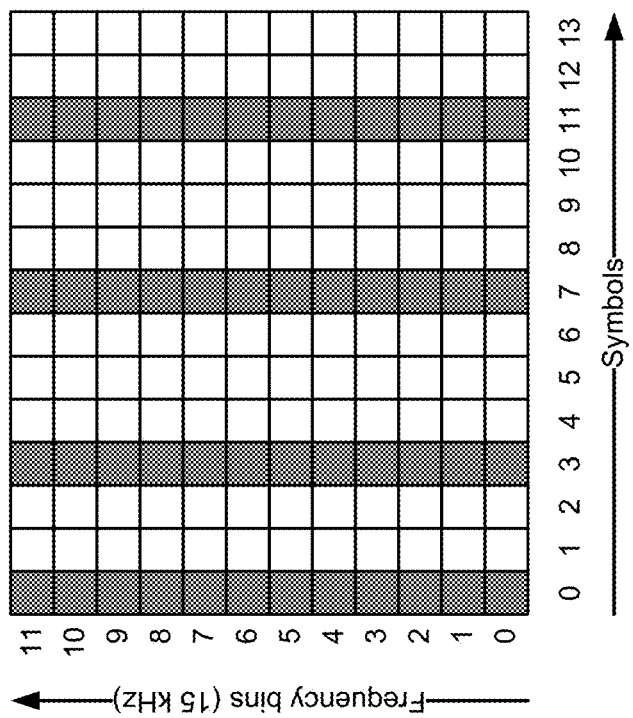
Figure 5D:
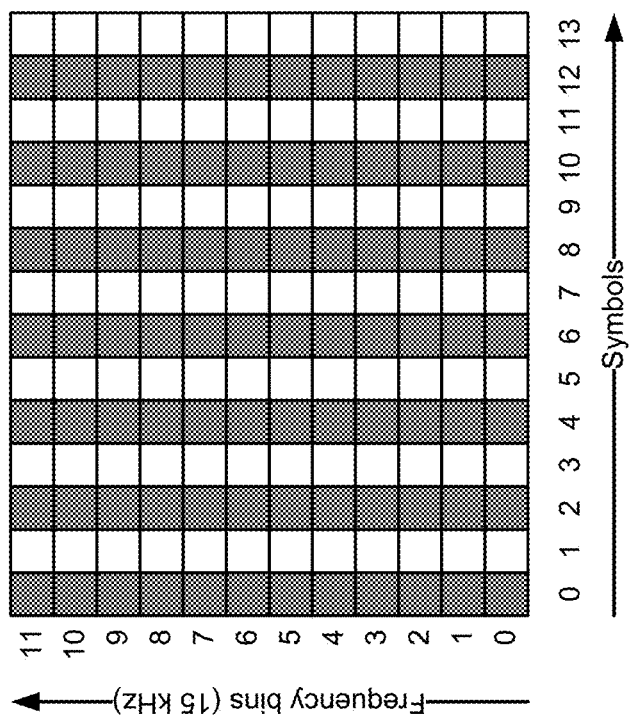

In a case where the time-varying channel fading effect dominates the errors in the position measure signals, the signal structure of FIG. 5B may be more preferable than, for example, the signal structures of FIGS. 3A and 3B. This is because in the signature structure of FIG. 5B, a resource block includes two symbols spaced apart by a relative large time gap (e.g., 6 symbol periods) whereas in the signature structure of FIGS. 3A and 3B, there is no time-gap between each symbol. As explained above, a large time gap can reduce the correlation in the channel fading effect between the repetitive transmission patterns, which can further improve the reduction of the time-varying fading component by averaging. Therefore, the signature structure of FIG. 5B may offer better protection against time-varying channel fading effect than the signal structures of FIGS. 3A and 3B.

c. Orthogonality

The qualities of position measurement signals received at the UE can also be affected by orthogonality between the signals transmitted by different base stations. Orthogonality between two signals can refer to lack of overlap in time or frequency between the two signals. The lack of overlap in time and frequency can reduce collision between the two signals. In a case where the UE performs position measurements based on signals received from a number of geographically distinct transmission points (e.g., different cell stations), orthogonality between the signals allows the UE to receive high quality signals from the cell stations simultaneously. On the other hand, lack of orthogonality can lead to signal collision and jamming. For example, the UE may be close to a very strong serving cell, while also having to measure a very weak neighbor cell. If the serving cell signal collides in time and frequency with that of the neighbor cell, the weaker neighbor cell signal may be completely jammed/swamped by the strong serving cell signal, and the UE may be unable to perform measurements based on signals received from the serving cell and from the neighbor cell.

A signal structure can be selected/configured to allow multiple cell stations to transmit orthogonal position measurement signals, while ensuring that the position measurement signals received from each cell station cover all of the subcarrier frequencies in a resource block. For example, referring to the signal structure of FIG. 5A, the position measurement signal can be represented by one symbol in a resource block (the symbol transmitted at symbol period 0), and the symbol is represented by all of the 12 subcarriers. With the signal structure of FIG. 5A, 13 symbol periods are allocated to other cell stations to transmit a single symbol in the same resource block as position measurement signal, and the single symbol can be transmitted at different symbol periods to maintain the orthogonality among the position measurement signals transmitted by cell stations (due to lack of overlap in time). In comparison, with the signal structure of FIG. 5B, which comprises two symbols transmitted in a pair of symbol periods (e.g., symbol periods 0 and 7) in one resource block, 12 symbol periods can be allocated to other cell stations, which allow up to six base stations to transmit two symbols in different symbol period pairs (e.g., symbol periods 1 and 8, 2 and 9, etc.). Compared with the signal structure of FIG. 5A, the signal structure of FIG. 5B allows fewer base stations to transmit orthogonal position measurement signals. Orthogonality can also be gained from transmission of the signal on different antenna beams at different points in time in cases where a cell is attached to a multi-beam antenna/antenna array. In such cases a sub-beam would support a smaller coverage area than a similar single wide-beam antenna. Thus, limiting collisions to a smaller geographical area.

d. Adaptation of Signal Structure

As described above, different signal structures can provide protection again against different sources of degradation of position measurement signal qualities. A signal structure can be selected based on, for example, which source of degradation is dominant, which in turn may depend on an operation condition of the UE. For example, if the UE is moving at a high speed (e.g., within a vehicle) such that Doppler effect dominates, signal structures that allow short measurement periods (e.g., any of signal structures FIG. 5A-5D) can be used. As another example, if the UE operates in an environment where the channel fading effect varies substantially with time (e.g., operating in an urban area where the UE may experience different degrees of blocking of position measurement signals at different locations), signal structures which include repetitive symbols spaced apart by a relative large time gap (e.g., signal structure of FIG. 5B) can be used although, as discussed above, such signal structures can reduce the number of base stations to transmit orthogonal position measurement signals within a resource block than, for example, a signal structure which does not have repetitive symbols within the resource block (e.g., signal structure of FIG. 5A). On the other hand, in a case where the UE is required to receive position measurement signals from a large number of base stations to perform position measurement, the signal structure of FIG. 5A may be preferred.

In some examples, a base station can determine the operation condition of the UE (e.g., whether the UE moves at high speed, operates in an urban area, uses a position measurement scheme which requires position measurement signals from a large number of sources, etc.), and select a signal structure for the position measurement signals accordingly, and indicate the selection to the UE using the techniques described above.

5. Methods

Figure 6:
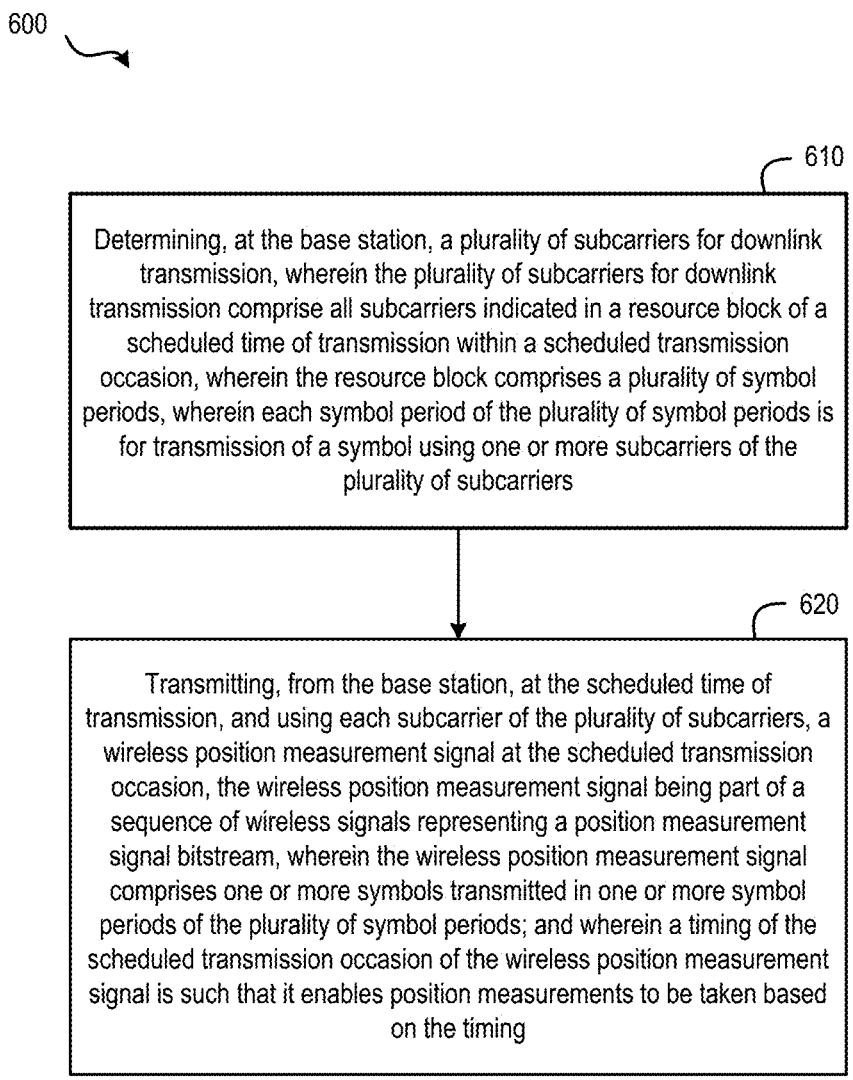
FIG. 6 is a flow diagram illustrating a method of locating a UE at a first base station, according to an embodiment.

FIG. 6 is a flow diagram illustrating a method 600 of locating a UE (e.g. UE 105) at a base station, according to an embodiment, which illustrates the functionality of a base station according to aspects of embodiments described above. According to some embodiments, the functionality of one or more blocks illustrated in FIG. 6 may be performed by a base station (e.g., a gNBs 110 and ng-eNB 114 of FIG. 1). And because a base station may comprise a computer system, means for performing these functions may include software and/or hardware components of a computer system, such as the computer system illustrated in FIG. 9 and described in more detail below.

The functionality of block 610 includes determining, at the base station, a plurality of subcarriers for downlink transmission, wherein the plurality of subcarriers for downlink transmission comprise all subcarriers indicated in a resource block of a scheduled time of transmission within a scheduled transmission occasion, wherein the resource block comprises a plurality of symbol periods, wherein each symbol period of the plurality of symbol periods is for transmission of a symbol using one or more subcarriers of the plurality of subcarriers. In some embodiments, the plurality of subcarriers for downlink transmission may comprise all subcarriers in a resource block. For example, for a normal length cyclic prefix using 15 kHz spacing, a group of 12 subcarriers may be determined. The subcarrier information can be determined based on, for example, the channel bandwidth allocated to the base station for downlink transmission of the positioning measurement signal, a physical identification value assigned to the given cell, or based on other configuration information. Means for performing the functionality at block 610 may comprise one or more components of a computer system, such as a bus 905, processing unit(s) 910, communication subsystem 930, working memory 935, operating system 940, application(s) 945, and/or other components of the communication network server 900 illustrated in FIG. 9 and described in more detail below.

The functionality of block 620 includes transmitting, from the base station, at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream, wherein the wireless position measurement signal comprises one or more symbols transmitted in one or more symbol periods of the plurality of symbol periods; and wherein a timing of the scheduled transmission occasion of the wireless position measurement signal is such that it enables position measurements to be taken based on the timing. The position measurement signal can be part of a sequence of radio/wireless signals representing a PRS bitstream and/or a position measurement signal bitstream in the 5G network. The position measurement signal can be broadcasted as a broadcast signal (e.g., which can be picked up by any UE within a pre-determined distance from the base station). The position measurement signal can also be targeted at a specific UE. The position measurement signal can be transmitted using one or more symbols based on the examples of resource elements mapping as shown, for example, FIGS. 3A-FIG. 5D. The resource element mapping patterns can be altered (e.g., by using a different set of resource elements at each symbol period) for different base stations. To transmit the PRS signal, the signal information can be used to modulate one or more subcarriers in one or more symbol periods based on the resource elements mapping to create one or more symbols. The symbols can be represented in a frequency domain and by a distribution of amplitudes and phases with respect to frequency. The frequency domain information of the symbols can be processed using an IFFT processor to create time-domain data. The time-domain data can be broadcasted in the form of radio signals. Means for performing the functionality at block 620 may comprise one or more components of a computer system, such as a bus 905, processing unit(s) 910, working memory 935, operating system 940, application(s) 945, and/or other components of the communication network server 900 illustrated in FIG. 9 and described in more detail below.

Figure 7:
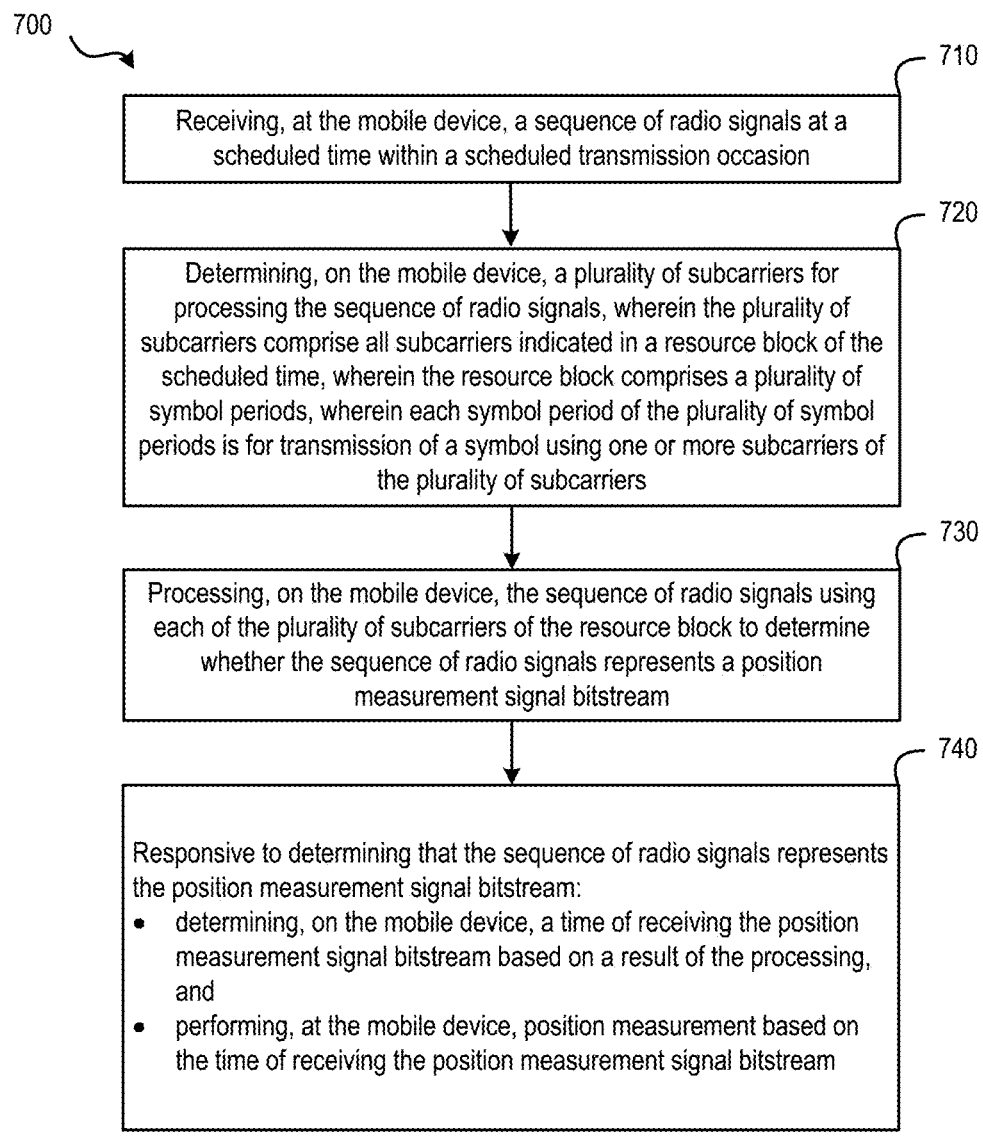
FIG. 7 is a flow diagram illustrating a method of locating a UE at the UE, according to an embodiment.
Figure 8:
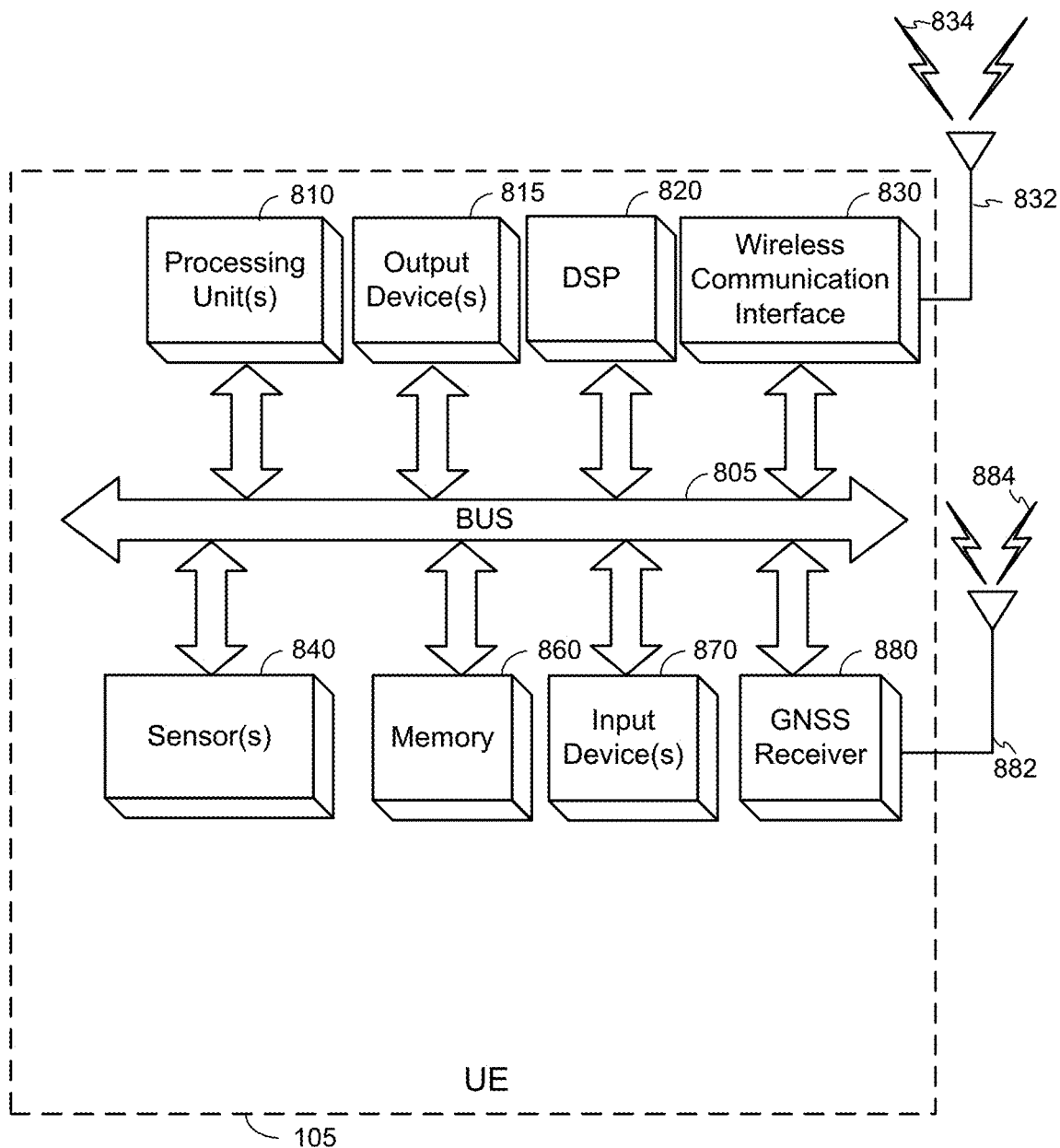
FIG. 8 is an embodiment of a UE.

FIG. 7 is a flow diagram illustrating a method 700 of locating a UE at the UE, according to an embodiment, which illustrates the functionality of a UE according to aspects of embodiments described above. According to some embodiments, functionality of one or more blocks illustrated in FIG. 7 may be performed by a mobile device including a UE (e.g. UE 105). Means for performing these functions may include software and/or hardware components of a UE 105, as illustrated in FIG. 8 and described in more detail below.

At block 710, the functionality includes receiving, at the mobile device, a sequence of radio signals at a scheduled time within a scheduled transmission occasion. The sequence of radio signals may represent, for example, a PRS bitstream, a position measurement signal bitstream in the 5G network, etc. The sequence of radio signals can be sampled to generate a set of digital signals. Means for performing the functions at block 710 may comprise a bus 805, processing unit(s) 810, wireless communication interface 830, memory 860, GNSS receiver 880, and/or other hardware and/or software components of a UE 105 as illustrated in FIG. 8 and described in more detail below.

At block 720, the functionality includes determining, on the mobile device, a plurality of subcarriers for processing the sequence of radio signals, wherein the plurality of subcarriers comprise all subcarriers indicated in a resource block of the scheduled time, wherein the resource block comprises a plurality of symbol periods, wherein each symbol period of the plurality of symbol periods is for transmission of a symbol using one or more subcarriers of the plurality of subcarriers. The UE may receive the resource block information based on, for example, assistance data from LPP Means for performing the functions at block 720 may comprise a bus 805, processing unit(s) 810, wireless communication interface 830, memory 860, GNSS receiver 880, and/or other hardware and/or software components of a UE 105 as illustrated in FIG. 8 and described in more detail below.

At block 730, the functionality includes processing, on the mobile device, the sequence of radio signals using each of the plurality of subcarriers of the resource block to determine whether the sequence of radio signals represents a position measurement signal bitstream (or a PRS bitstream). The processing may include, for example, performing FFT operation on the digital samples of the radio signals to extract one or more resource elements for each symbol, performing correlation operations by multiplying the output of the FFT operation with one or more descrambling sequences including the complex conjugates of the resource elements, and performing averaging of the correlation products for each subcarrier to generate a frequency domain vector. The descrambling sequences can be based on the examples of resource elements mapping in FIGS. 3A-5D. For example, in a case where each subcarrier is modulated the same number of times in a resource block to transmit the symbols (e.g., as in FIGS. 4A-5D), the same number of averaging operations can be performed for each subcarrier. Moreover, in a case where each symbol uses the same set of subcarriers, the same descrambling sequence can be used to perform correlation for each subcarrier. The descrambling sequence can be cell/base station specific, and can be obtained from (or generated based on information obtained from) assistance data from a location server (e.g. LMF 120 of FIG. 1). The frequency domain vector can then be processed by an IFFT processor to generate time-domain data, which can then be demodulated to recover a bitstream. Means for performing the functions at block 730 may comprise a bus 805, processing unit(s) 810, wireless communication interface 830, memory 860, GNSS receiver 880, and/or other hardware and/or software components of a UE 105 as illustrated in FIG. 8 and described in more detail below.

At block 740, the functionality includes, responsive to determining that the sequence of radio signals represents the position measurement signal bitstream: determining, on the mobile device, a time of receiving the position measurement signal bitstream based on a result of the processing, and performing, at the mobile device, position measurement based on the time of receiving the position measurement signal bitstream. The time can be determined based on, for example, determining a sample timestamp for a peak signal (obtained from block 730) of which the power exceeds a pre-determined threshold. The sample timestamp can be used to represent the time of receiving the position measurement signal bitstream. The UE can receive position measurement signal bistreams from multiple base stations and measure the peak sample timestamps for the received position measurement signals, and position measurement can be performed based on the sample timestamps. On the other hand, if a position measurement signal stream is not detected from the radio signals at block 730, the UE can proceed to process the next set of received radio signals by proceeding back to, for example, block 710. Means for performing the functions at block 740 may comprise a bus 805, processing unit(s) 810, wireless communication interface 830, memory 860, GNSS receiver 880, and/or other hardware and/or software components of a UE 105 as illustrated in FIG. 8 and described in more detail below.

6. Systems

FIG. 8 illustrates an embodiment of a UE 105, which can be utilized as described herein above (e.g. in association with FIGS. 1-9). For example, the UE 105 can perform one or more of the functions of method 700 of FIG. 7. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate DSP 820, depending on desired functionality. Location determination and/or other determinations based on wireless communication may be provided in the processing unit(s) 810 and/or wireless communication interface 830 (discussed below). The UE 105 also can include one or more input devices 870, which can include without limitation a touch screen, a touch pad, microphone, button(s), dial(s), switch(es), and/or the like; and one or more output devices 815, which can include without limitation a display, light emitting diode (LED), speakers, and/or the like.

The UE 105 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable the UE 105 to communicate via the networks described above with regard to FIG. 1. The wireless communication interface 830 may permit data to be communicated with a network, eNBs, gNBs, and/or other network components, computer systems, and/or any other electronic devices described herein. The communication can be carried out via one or more wireless communication antenna(s) 832 that send and/or receive wireless signals 834.

Depending on desired functionality, the wireless communication interface 830 may comprise separate transceivers to communicate with base stations (e.g., eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. 5G, LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 840. Such sensors may comprise, without limitation, one or more inertial sensors (e.g., accelerometer(s), gyroscope(s), and or other IMUs), camera(s), magnetometer(s), altimeter(s), microphone(s), proximity sensor(s), light sensor(s), and the like, some of which may be used to complement and/or facilitate the position determination described herein.

Embodiments of the UE 105 may also include a GNSS receiver 880 capable of receiving signals 884 from one or more GNSS satellites (e.g., SVs 190) using an GNSS antenna 882. Such positioning can be utilized to complement and/or incorporate the techniques described herein. The GNSS receiver 880 can extract a position of the UE 105, using conventional techniques, from GNSS SVs of a GNSS system, such as Global Positioning System (GPS), Galileo, Glonass, Compass, Quasi-Zenith Satellite System (QZSS) over Japan, Indian Regional Navigational Satellite System (IRNSS) over India, Beidou over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 105 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by the UE 105 (and/or processing unit(s) 810 or DSP 820 within UE 105). In an aspect, then, such code and/or instructions can be used to configure and/or adapt a general purpose computer (or other device) to perform one or more operations in accordance with the described methods.

Figure 9:
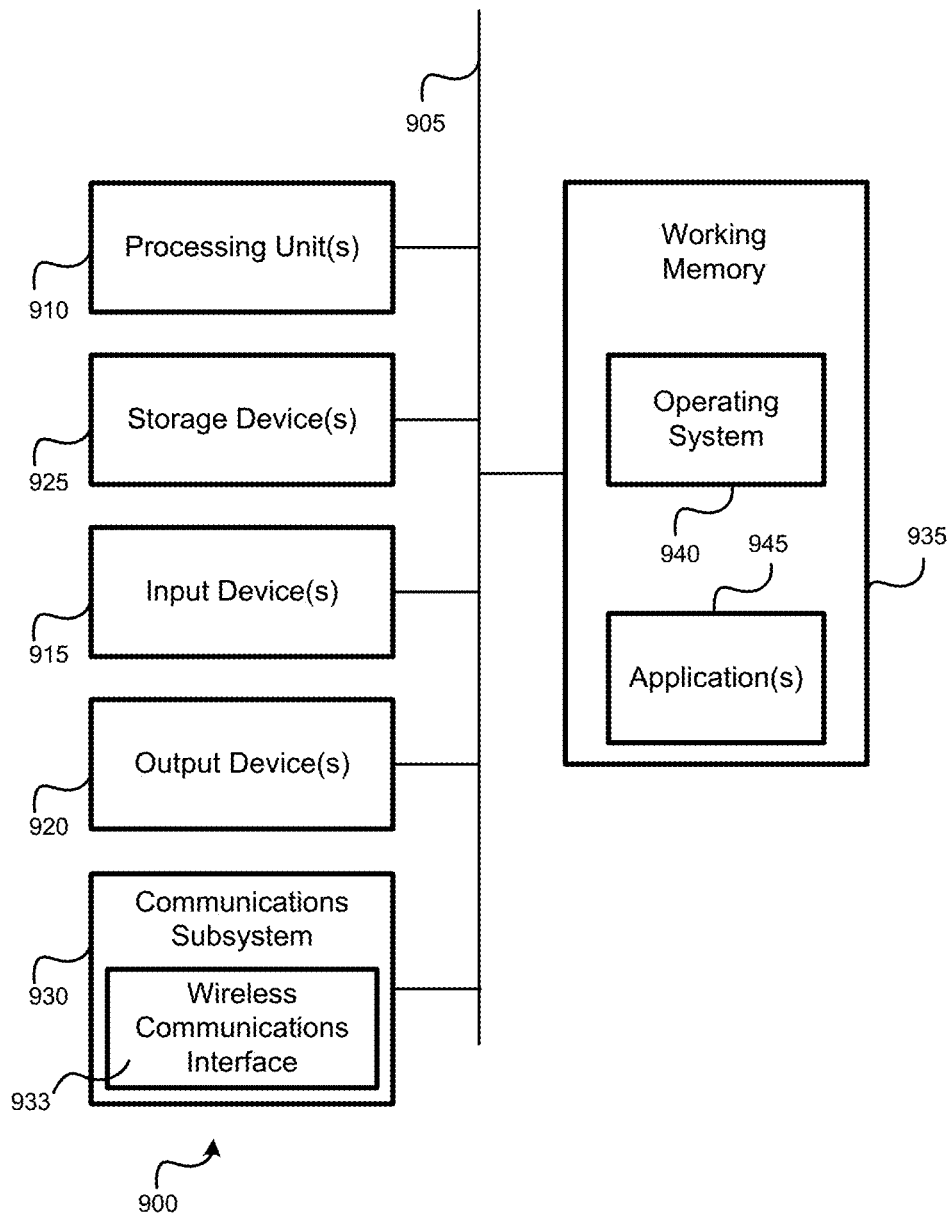
FIG. 9 is an embodiment of a computer system.

FIG. 9 illustrates an embodiment of a communication network server 900, which may be utilized and/or incorporated into one or more components of a communication system (e.g., communication system 100 of FIG. 1), including various components, a 5G network, including the 5G RAN and 5GC, and/or similar components of other network types. FIG. 9 provides a schematic illustration of one embodiment of a communication network server 900 that can perform the methods provided by various other embodiments, such as the method described in relation to FIG. 6. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical or geographical locations. In some embodiments, communication network server 900 may correspond to an LMF 120, a gNB 110 (e.g. gNB 110-1), an eNB, an E-SMLC, a SUPL SLP and/or some other type of location-capable device.

Communication network server 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 6. Communication network server 900 also can include one or more input devices 915, which can include without limitation a mouse, a keyboard, a camera, a microphone, and/or the like; and one or more output devices 920, which can include without limitation a display device, a printer, and/or the like.

Communication network server 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Communication network server 900 may also include a communications subsystem 930, which can include support of wireline communication technologies and/or wireless communication technologies (in some embodiments) managed and controlled by a wireless communication interface 933. The communications subsystem 930 may include a modem, a network card (wireless or wired), an infrared communication device, a wireless communication device, and/or a chipset, and/or the like. The communications subsystem 930 may include one or more input and/or output communication interfaces, such as the wireless communication interface 933, to permit data to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, communication network server 900 will further comprise a working memory 935, which can include a RAM and/or ROM device. Software elements, shown as being located within the working memory 935, can include an operating system 940, device drivers, executable libraries, and/or other code, such as application(s) 945, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 6, may be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as communication network server 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by communication network server 900 and/or might take the form of source and/or installable code, which, upon compilation and/or installation on communication network server 900 (e.g., using any of a variety of generally available compilers, installation programs, compression/decompression utilities, etc.), then takes the form of executable code.

Figure 10:
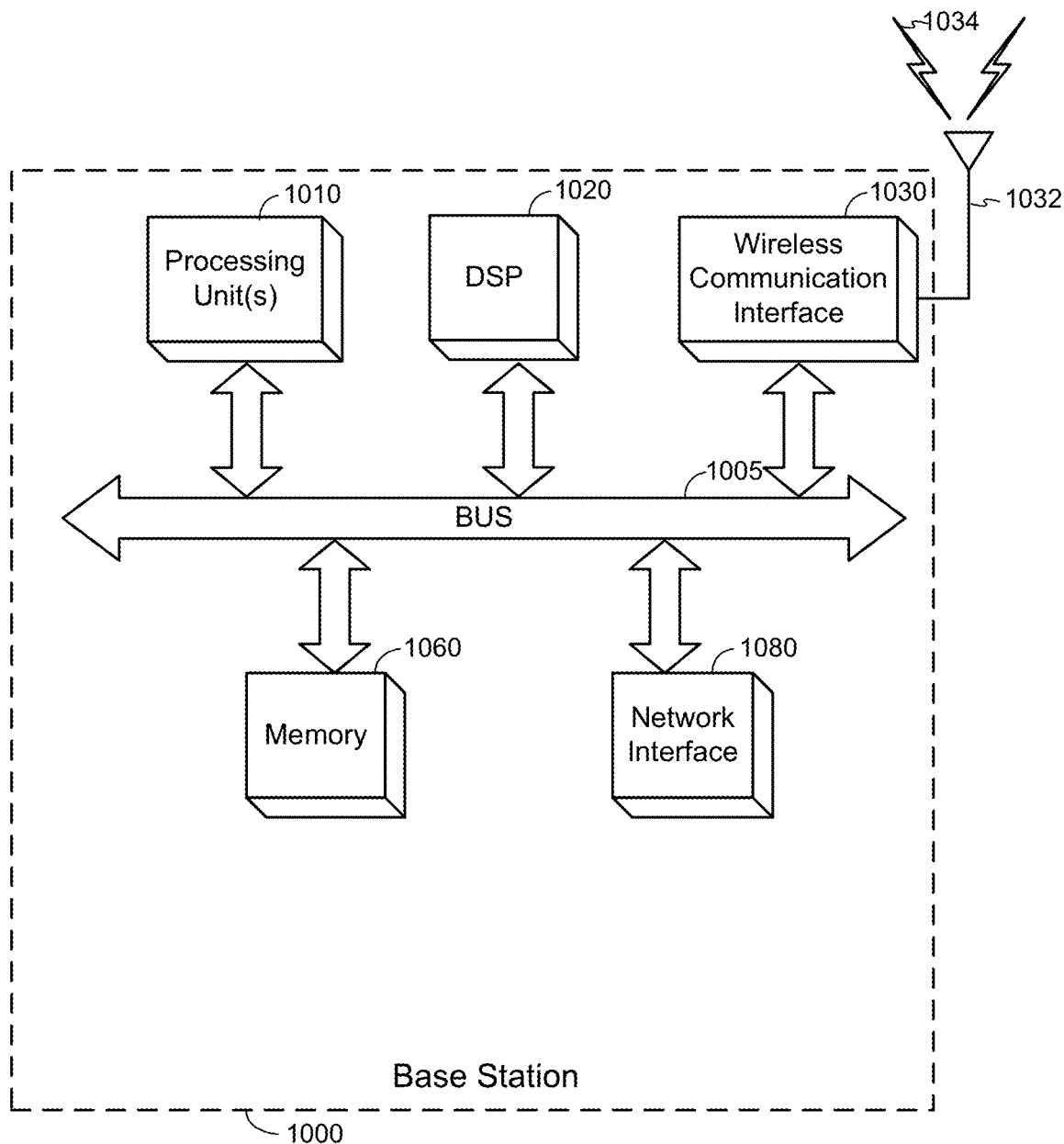
FIG. 10 is an embodiment of a base station.

FIG. 10 illustrates an embodiment of a base station 1000, which can be utilized as described herein above (e.g. in association with FIGS. 1-7). For example, base station 1000 can perform one or more of the functions of method 600 of FIG. 6. It should be noted that FIG. 10 is meant only to provide a generalized illustration of various components, any or all of which may be utilized as appropriate. In some embodiments, the base station 1000 may correspond to an LMF 120, a gNB 110, an ng-eNB 114 as described herein above.

The base station 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or wireless communication interface 1030 (discussed below). The base station 1000 also can include one or more input devices 1070, which can include without limitation a keyboard, display, mouse, microphone, button(s), dial(s), switch(es), and/or the like; and one or more output devices 1015, which can include without limitation a display, light emitting diode (LED), speakers, and/or the like.

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, cellular communication facilities, etc.), and/or the like, which may enable the base station 1000 to communicate as described herein. The wireless communication interface 1030 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 934.

Base station 1000 may also include a network interface 1080, which can include support of wireline communication technologies. Network interface 1080 may include a modem, network card, chipset, and/or the like. Network interface 1080 may include one or more input and/or output communication interfaces to permit data to be exchanged with a network, communication network servers, computer systems, and/or any other electronic devices described herein.

In many embodiments, base station 1000 will further comprise a memory 1060. Memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

Memory 1060 of the base station 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by base station 1000 (and/or processing unit(s) 910 or DSP 1020 within base station 1000). In an aspect, then, such code and/or instructions can be used to configure and/or adapt a general purpose computer (or other device) to perform one or more operations in accordance with the described methods.

According to some examples, an apparatus for providing position measurements signals in a wireless communication network is provided. The apparatus comprises: means for determining a plurality of subcarriers for downlink transmission, wherein the plurality of subcarriers for downlink transmission comprise all subcarriers indicated in a resource block of a scheduled time of transmission within a scheduled transmission occasion, wherein the resource block comprises a plurality of symbol periods, wherein each symbol period of the plurality of symbol periods is for transmission of a symbol using one or more subcarriers of the plurality of subcarriers. The apparatus further comprises means for transmitting at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream. The wireless position measurement signal comprises one or more symbols transmitted in one or more symbol periods of the plurality of symbol periods. A timing of the scheduled transmission occasion of the wireless position measurement signal is such that it enables position measurements to be taken based on the timing.

In some aspects, the wireless position measurement signal comprises a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the wireless position measurement signal comprising the plurality of symbols. In some aspects, at least two subcarriers of the plurality of subcarriers are used for transmission of different numbers of symbols.

In some aspects, each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols which are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

According to some examples, an apparatus for performing position measurement is provided. The apparatus comprises: means for receiving a sequence of radio signals at a scheduled time within a scheduled transmission occasion; means for determining a plurality of subcarriers for processing the sequence of radio signals, wherein the plurality of subcarriers comprise all subcarriers indicated in a resource block of the scheduled time, wherein the resource block comprises a plurality of symbol periods, wherein each symbol period of the plurality of symbol periods is for transmission of a symbol using one or more subcarriers of the plurality of subcarriers; means for processing the sequence of radio signals using each of the plurality of subcarriers of the resource block to determine whether the sequence of radio signals represents a position measurement signal bitstream; and means for: responsive to determining that the sequence of radio signals represents the position measurement signal bitstream, determining a time of receiving the position measurement signal bitstream based on a result of the processing, and performing position measurement based on the time of receiving the position measurement signal bitstream.

In some aspects, the sequence of radio signals represents a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the plurality of symbols. In some aspects, at least two subcarriers of the plurality of subcarriers are used for transmission of different numbers of symbols.

In some aspects, the sequence of radio signals comprises one or more symbols. Each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols. The two symbols are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

In some aspects, the apparatus further comprises: means for generating a set of samples of the sequence of radio signals, each sample of the set of samples being associated with a timestamp; means for processing the set of samples using a Fast Fourier Transform (FFT) processor to generate a sequence of amplitudes and phases of each subcarrier of the plurality of subcarriers; means for performing correlation operations on the sequence of amplitudes and phases to obtain one or more correlation products for each subcarrier of the plurality of subcarriers; means for determining an average of the one or more correlation products for each subcarrier of the plurality of subcarriers; means for obtaining a frequency domain vector based on the average of the one or more correlation products for each subcarrier of the plurality of subcarriers; and means for reconstructing, at the mobile device, a sequence of time-domain signals based on the frequency domain vector. Processing the sequence of radio signals using each of the plurality of subcarriers of the resource block to determine whether the sequence of radio signals represents a position measurement signal bitstream comprises using the sequence of time-domain signals to determine whether the sequence of radio signals represents a position measurement signal bitstream.

According to some examples, a non-transitory computer readable medium is provided. The non-transitory computer readable medium stores instructions that, when executed by a hardware processor, causes the hardware processor to perform operations for providing position measurements signals in a wireless communication network. The operations comprise: determining a plurality of subcarriers for downlink transmission, wherein the plurality of subcarriers for downlink transmission comprise all subcarriers indicated in a resource block of a scheduled time of transmission within a scheduled transmission occasion, wherein the resource block comprises a plurality of symbol periods, wherein each symbol period of the plurality of symbol periods is for transmission of a symbol using one or more subcarriers of the plurality of subcarriers. The operations further comprise: transmitting at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream. The wireless position measurement signal comprises one or more symbols transmitted in one or more symbol periods of the plurality of symbol periods. A timing of the scheduled transmission occasion of the wireless position measurement signal is such that it enables position measurements to be taken based on the timing.

In some aspects, the wireless position measurement signal comprises a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the wireless position measurement signal comprising the plurality of symbols. In some aspects, at least two subcarriers of the plurality of subcarriers are used for transmission of different numbers of symbols.

In some aspects, each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols which are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

According to some examples, a non-transitory computer readable medium is provided. The non-transitory computer readable medium stores instructions that, when executed by a hardware processor, causes the hardware processor to perform operations for performing position measurement. The operations include: receiving a sequence of radio signals at a scheduled time within a scheduled transmission occasion; determining a plurality of subcarriers for processing the sequence of radio signals, wherein the plurality of subcarriers comprise all subcarriers indicated in a resource block of the scheduled time, wherein the resource block comprises a plurality of symbol periods, wherein each symbol period of the plurality of symbol periods is for transmission of a symbol using one or more subcarriers of the plurality of subcarriers. The operations also include processing the sequence of radio signals using each of the plurality of subcarriers of the resource block to determine whether the sequence of radio signals represents a position measurement signal bitstream; and responsive to determining that the sequence of radio signals represents the position measurement signal bitstream, determining a time of receiving the position measurement signal bitstream based on a result of the processing, and performing position measurement based on the time of receiving the position measurement signal bitstream.

In some aspects, the sequence of radio signals represents a plurality of symbols, each symbol of the plurality of symbols being transmitted in each symbol period of the plurality of symbol periods. Each symbol of the plurality of symbols is transmitted using at least one subcarrier of the plurality of subcarriers, such that each subcarrier of the plurality of subcarriers is used at least once for the transmission of the plurality of symbols. In some aspects, at least two subcarriers of the plurality of subcarriers are used for transmission of different numbers of symbols.

In some aspects, the sequence of radio signals comprises one or more symbols. Each symbol of the one or more symbols is transmitted using more than one subcarrier of the plurality of subcarriers such that each subcarrier of the plurality of subcarriers is used for transmission of same number of symbols. In some aspects, the one or more symbols comprise two symbols. The two symbols are transmitted using two different sets of subcarriers of the plurality of subcarriers. In some aspects, each symbol of the one or more symbols is transmitted using the plurality of subcarriers.

In some aspects, the resource block includes a physical resource block (PRB). A pairing of each symbol period of the plurality of symbol periods and each subcarrier of the plurality of subcarriers forms a resource element (RE) of the PRB.

In some aspects, the non-transitory computer readable medium further stores instructions that, when executed by the hardware processor, causes the hardware processor to perform operations including: generating a set of samples of the sequence of radio signals, each sample of the set of samples being associated with a timestamp; processing the set of samples using a Fast Fourier Transform (FFT) processor to generate a sequence of amplitudes and phases of each subcarrier of the plurality of subcarriers; performing correlation operations on the sequence of amplitudes and phases to obtain one or more correlation products for each subcarrier of the plurality of subcarriers; determining an average of the one or more correlation products for each subcarrier of the plurality of subcarriers; obtaining a frequency domain vector based on the average of the one or more correlation products for each subcarrier of the plurality of subcarriers; and reconstructing, at the mobile device, a sequence of time-domain signals based on the frequency domain vector. Processing the sequence of radio signals using each of the plurality of subcarriers of the resource block to determine whether the sequence of radio signals represents a position measurement signal bitstream comprises using the sequence of time-domain signals to determine whether the sequence of radio signals represents a position measurement signal bitstream.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense.

In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

The invention claimed is:

1. A method, on a base station, for providing position measurements signals in a wireless communication network, the method comprising:
   determining, at the base station, a plurality of subcarriers for downlink transmission, wherein the plurality of subcarriers for downlink transmission comprise all subcarriers indicated in a resource block of a scheduled time of transmission within a scheduled transmission occasion, wherein the plurality of subcarriers is mapped to a plurality of symbol periods of a radio subframe based on a pattern in which:
      each subcarrier of the plurality of subcarriers is mapped to multiple symbol periods,
      the number of multiple symbol periods is the same for every subcarrier,
      fewer than all of the plurality of subcarriers are mapped to each individual symbol period,
      the subcarriers mapped to any individual symbol period are uniformly spaced apart in frequency, and
      the subcarriers that are mapped vary across different symbol periods, and
   wherein, in the pattern:
      (i) each subcarrier is mapped to at least three symbol periods of the plurality of symbol periods, or
      (ii) each symbol period of the plurality of symbol periods has at least three subcarriers of the plurality of subcarriers mapped to it, the at least three subcarriers being uniformly spaced apart in frequency, or
      both (i) and (ii); and
   transmitting, from the base station, at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream,
   wherein the wireless position measurement signal comprises a plurality of symbols transmitted in the plurality of symbol periods and according to the pattern; and
   wherein a timing of the scheduled transmission occasion of the wireless position measurement signal is such that it enables position measurements to be taken based on the timing.

2. The method of claim 1, wherein, in the pattern, each subcarrier is mapped to at least three symbol periods of the plurality of symbol periods.

3. The method of claim 1, wherein each symbol period of the plurality of symbol periods has at least three subcarriers of the plurality of subcarriers mapped to it, and the at least three subcarriers are uniformly spaced apart in frequency.

4. The method of claim 1, wherein the resource block includes a physical resource block (PRB); and
   wherein a pairing of each symbol period of the plurality of symbol periods and each subcarrier of the plurality of subcarriers forms a resource element (RE) of the PRB.

5. The method of claim 1, further comprising: selecting the mapping between the plurality of subcarriers and the plurality of symbol periods based on a velocity of a mobile device that receives the wireless position measurement signal to perform the position measurements.

6. The method of claim 1, wherein the method further comprises: selecting the mapping between the plurality of subcarriers and the plurality of symbol periods based on detecting a time-varying channel fading effect that degrades the downlink transmission.

7. The method of claim 1, wherein in the pattern, any symbol period that has a subcarrier mapped to it has multiple subcarriers of the plurality of subcarriers mapped to it, the number of multiple subcarriers being the same for every symbol period that has a subcarrier mapped to it.

8. The method of claim 7, wherein in the pattern, some symbol periods do not have any subcarriers mapped thereto.

9. A method, on a mobile device, for performing position measurement, the method comprising:
   receiving, at the mobile device, a sequence of radio signals at a scheduled time within a scheduled transmission occasion;
   determining, on the mobile device, a plurality of subcarriers for processing the sequence of radio signals, wherein the plurality of subcarriers comprise all subcarriers indicated in a resource block of the scheduled time, wherein the plurality of subcarriers is mapped to a plurality of symbol periods of a radio subframe based on a pattern in which:
      each subcarrier of the plurality of subcarriers is mapped to multiple symbol periods,
      the number of multiple symbol periods is the same for every subcarrier,
      fewer than all of the plurality of subcarriers are mapped to each individual symbol period,
      the subcarriers mapped to any individual symbol period are uniformly spaced apart in frequency, and
      the subcarriers that are mapped vary across different symbol periods, and
   wherein, in the pattern:
      (i) each subcarrier is mapped to at least three symbol periods of the plurality of symbol periods, or
      (ii) each symbol period of the plurality of symbol periods has at least three subcarriers of the plurality of subcarriers mapped to it, the at least three subcarriers being uniformly spaced apart in frequency, or
      both (i) and (ii);
   processing, on the mobile device, the sequence of radio signals using each of the plurality of subcarriers of the resource block to determine whether the sequence of radio signals represents a position measurement signal bitstream; and responsive to determining that the sequence of radio signals represents the position measurement signal bitstream:
    determining, on the mobile device, a time of receiving the position measurement signal bitstream based on a result of the processing, and
    performing, at the mobile device, position measurement based on the time of receiving the position measurement signal bitstream.

10. The method of claim 9, wherein the sequence of radio signals represents a plurality of symbols, each symbol of the plurality of symbols being transmitted in a respective symbol period of the plurality of symbol periods; and
    wherein, in the pattern, each subcarrier is mapped to at least three symbol periods of the plurality of symbol periods.

11. The method of claim 9, wherein, in the pattern, each subcarrier is mapped to at least three symbol periods of the plurality of symbol periods.

12. The method of claim 9, wherein each symbol period of the plurality of symbol periods has at least three subcarriers of the plurality of subcarriers mapped to it, and the at least three subcarriers are uniformly spaced apart in frequency.

13. The method of claim 9, wherein the resource block includes a physical resource block (PRB); and
    wherein a pairing of each symbol period of the plurality of symbol periods and each subcarrier of the plurality of subcarriers forms a resource element (RE) of the PRB.

14. The method of claim 9, further comprising:
    generating, at the mobile device, a set of samples of the sequence of radio signals, each sample of the set of samples being associated with a timestamp;
    processing, at the mobile device, the set of samples using a Fast Fourier Transform (FFT) processor to generate a sequence of amplitudes and phases of each subcarrier of the plurality of subcarriers;
    performing, at the mobile device, correlation operations on the sequence of amplitudes and phases to obtain one or more correlation products for each subcarrier of the plurality of subcarriers;
    determining, at the mobile device, an average of the one or more correlation products for each subcarrier of the plurality of subcarriers;
    obtaining, at the mobile device, a frequency domain vector based on the average of the one or more correlation products for each subcarrier of the plurality of subcarriers; and
    reconstructing, at the mobile device, a sequence of time-domain signals based on the frequency domain vector,
    wherein processing the sequence of radio signals using each of the plurality of subcarriers of the resource block to determine whether the sequence of radio signals represents a position measurement signal bitstream comprises using the sequence of time-domain signals to determine whether the sequence of radio signals represents a position measurement signal bitstream.

15. The method of claim 9, further comprising:
    performing, at the mobile device, correlation operations based on the sequence of radio signals to obtain one or more correlation products for each subcarrier of the plurality of subcarriers;
    obtaining, at the mobile device, a frequency domain vector based on an average of the one or more correlation products for each subcarrier of the plurality of subcarriers;
    reconstructing, at the mobile device, a sequence of time-domain signals based on the frequency domain vector; and
    determining whether the sequence of radio signals represents a position measurement signal bitstream based on the sequence of time-domain signals.

16. A base station for providing position measurements signals in a wireless communication network, the base station comprising:
    a memory;
    a wireless communication interface; and
    one or more processing units coupled to the memory and the wireless communication interface, wherein the one or more processing units are configured to:
        determine a plurality of subcarriers for downlink transmission, wherein the plurality of subcarriers for downlink transmission comprise all subcarriers indicated in a resource block of a scheduled time of transmission within a scheduled transmission occasion, wherein the plurality of subcarriers is mapped to a plurality of symbol periods of a radio subframe based on a pattern in which:
            each subcarrier of the plurality of subcarriers is mapped to multiple symbol periods,
            the number of multiple symbol periods is the same for every subcarrier,
            fewer than all of the plurality of subcarriers are mapped to each individual symbol period,
            the subcarriers mapped to any individual symbol period are uniformly spaced apart in frequency, and
            the subcarriers that are mapped vary across different symbol periods, and
        wherein, in the pattern:
            (i) each subcarrier is mapped to at least three symbol periods of the plurality of symbol periods, or
            (ii) each symbol period of the plurality of symbol periods has at least three subcarriers of the plurality of subcarriers mapped to it, the at least three subcarriers being uniformly spaced apart in frequency, or
            both (i) and (ii); and
        transmit, at the scheduled time of transmission, and using each subcarrier of the plurality of subcarriers, a wireless position measurement signal at the scheduled transmission occasion, the wireless position measurement signal being part of a sequence of wireless signals representing a position measurement signal bitstream,
    wherein the wireless position measurement signal comprises a plurality of symbols transmitted in the plurality of symbol periods; and
    wherein a timing of the scheduled transmission occasion of the wireless position measurement signal is such that it enables position measurements to be taken based on the timing.

17. The base station of claim 16, wherein, in the pattern, each subcarrier is mapped to at least three symbol periods of the plurality of symbol periods.

18. The base station of claim 16, wherein, in the pattern, each subcarrier is mapped to at least three symbol periods of the plurality of symbol periods, and the at leas three symbol periods are uniformly spaced apart in time, with at least one unmapped symbol period in between mapped symbol periods.

19. The base station of claim 16, wherein, in the pattern, each symbol period of the plurality of symbol periods has at least three subcarriers of the plurality of subcarriers mapped to it, and the at least three subcarriers are uniformly spaced apart in frequency.

20. The base station of claim 16, wherein the resource block includes a physical resource block (PRB); and
wherein a pairing of each symbol period of the plurality of symbol periods and each subcarrier of the plurality of subcarriers forms a resource element (RE) of the PRB.

21. A mobile device for performing position measurement, the mobile device comprising:
a memory;
a wireless communication interface; and
one or more processing units coupled to the memory and the wireless communication interface, wherein the one or more processing units are configured to:
receive a sequence of radio signals at a scheduled time within a scheduled transmission occasion;
determine a plurality of subcarriers for processing the sequence of radio signals, wherein the plurality of subcarriers comprise all subcarriers indicated in a resource block of the scheduled time, wherein the plurality of subcarriers is mapped to a plurality of symbol periods of a radio subframe based on a pattern in which
each subcarrier of the plurality of subcarriers is mapped to multiple symbol periods,
the number of multiple symbol periods being the same for every subcarrier,
fewer than all of the plurality of subcarriers are mapped to each individual symbol period,
the subcarriers mapped to any individual symbol period are uniformly spaced apart in frequency, and
the subcarriers that are mapped vary across different symbol periods, and
wherein, in the pattern:
(i) each subcarrier is mapped to at least three symbol periods of the plurality of symbol periods, or
(ii) each symbol period of the plurality of symbol periods has at least three subcarriers of the plurality of subcarriers mapped to it, the at least three subcarriers being uniformly spaced apart in frequency, or
both (i) and (ii);
process the sequence of radio signals using each of the plurality of subcarriers of the resource block to determine whether the sequence of radio signals represents a position measurement signal bitstream; and
responsive to determining that the sequence of radio signals represents a position measurement signal bitstream:
determine a time of receiving the position measurement signal bitstream based on a result of the processing, and
perform position measurement based on the time of receiving the position measurement signal bitstream.

22. The mobile device of claim 21, wherein the sequence of radio signals represents a plurality of symbols, each symbol of the plurality of symbols being transmitted in a respective symbol period of the plurality of symbol periods; and
wherein, in the pattern, each subcarrier is mapped to at least three symbol periods of the plurality of symbol periods.

23. The mobile device of claim 21, wherein, in the pattern, each subcarrier is mapped to at least three symbol periods of the plurality of symbol periods.

24. The mobile device of claim 21, wherein each symbol period of the plurality of symbol periods has at least three subcarriers of the plurality of subcarriers mapped to it, and the at least three subcarriers are uniformly spaced apart in frequency.

25. The mobile device of claim 21, wherein the resource block includes a physical resource block (PRB); and
wherein a pairing of each symbol period of the plurality of symbol periods and each subcarrier of the plurality of subcarriers forms a resource element (RE) of the PRB.

26. The mobile device of claim 21, wherein the one or more processing units are configured to:
generate a set of samples of the sequence of radio signals, each sample of the set of samples being associated with a timestamp;
process the set of samples using a Fast Fourier Transform (FFT) processor to generate a sequence of amplitudes and phases of each subcarrier of the plurality of subcarriers;
perform correlation operations on the sequence of amplitudes and phases to obtain one or more correlation products for each subcarrier of the plurality of subcarriers;
determine an average of the one or more correlation products for each subcarrier of the plurality of subcarriers;
obtain a frequency domain vector based on the average of the one or more correlation products for each subcarrier of the plurality of subcarriers; and
reconstruct a sequence of time-domain signals based on the frequency domain vector,
wherein processing the sequence of radio signals using each of the plurality of subcarriers of the resource block to determine whether the sequence of radio signals represents a position measurement signal bitstream comprises the one or more processing units being configured to use the sequence of time-domain signals to determine whether the sequence of radio signals represents a position measurement signal bitstream.

* * * * *